United States Patent [19]

Field, II

[11] 4,423,343

[45] Dec. 27, 1983

[54] SYNCHRONOUS MOTOR SYSTEM

[75] Inventor: John H. Field, II, Medfield, Mass.

[73] Assignee: Sigma Instruments, Inc., Braintree, Mass.

[21] Appl. No.: 249,821

[22] Filed: Apr. 1, 1981

[51] Int. Cl.³ .......................................... H02K 37/00
[52] U.S. Cl. .................. 310/49 R; 310/216; 310/218
[58] Field of Search .......... 310/49 A, 49 R, 162–165, 310/216, 218, 269, 194

[56] References Cited

U.S. PATENT DOCUMENTS

| 2,235,903 | 3/1941 | Schönfelder | 310/216 |
| 3,441,760 | 4/1969 | Collens | 310/218 |
| 4,255,696 | 3/1981 | Field | 310/49 R |

OTHER PUBLICATIONS

IBM Technical Disclosure Bulletin, vol. 6, No. 9, Feb. 1964, pp. 19–20, Thompson, L. J., "Linear Incremental Motor".

Primary Examiner—Donovan F. Duggan
Assistant Examiner—Anita M. Ault
Attorney, Agent, or Firm—Toren, McGeady and Stanger

[57] ABSTRACT

In the disclosed system, the stator of a motor is provided with a plurality of radially directed stator poles, each having stator teeth arranged in a circle around an axis, and includes permanently magnetized rotor teeth facing the poles. The number of poles on the stator is sixteen at regular intervals of 22½ degrees, each having teeth offset from the teeth on the poles 90 degrees therefrom by one full pitch and offset from the teeth on adjacent poles by one-quarter pitch. According to an embodiment, the coils are energized digitally to move the rotor at one-half, one-quarter, one-eighth, one-sixteenth, and one-thirty second steps. According to another embodiment, the poles are spaced and shaped to permit large preformed windings to be mounted thereon.

13 Claims, 30 Drawing Figures

16 PHASE BIPOLAR

| STATE | $Q_E$ | $Q_D$ | $Q_C$ | $Q_B$ | $Q_A$ | I1/A1 | I2/A2 | J1/B1 | J2/B2 | K1/C1 | K2/C2 | L1/D1 | L2/D2 | M1/E1 | M2/E2 | N1/F1 | N2/F2 | O1/G1 | O2/G2 | P1/H1 | P2/H2 |
|---|---|---|---|---|---|---|---|---|---|---|---|---|---|---|---|---|---|---|---|---|---|
| 0  | 0 | 0 | 0 | 0 | 0 | 1 | 0 | 1 | 0 | 1 | 0 | 1 | 0 | 1 | 0 | 1 | 0 | 1 | 0 | 1 | 0 |
| 1  | 0 | 0 | 0 | 0 | 1 | 1 | 0 | 1 | 0 | 1 | 0 | 0 | 0 | 1 | 0 | 1 | 0 | 1 | 0 | 1 | 0 |
| 2  | 0 | 0 | 0 | 1 | 0 | 1 | 0 | 1 | 0 | 0 | 0 | 0 | 0 | 1 | 0 | 1 | 0 | 1 | 0 | 1 | 0 |
| 3  | 0 | 0 | 0 | 1 | 1 | 1 | 0 | 0 | 0 | 0 | 0 | 0 | 0 | 1 | 0 | 1 | 0 | 1 | 0 | 1 | 0 |
| 4  | 0 | 0 | 1 | 0 | 0 | 0 | 0 | 0 | 0 | 0 | 0 | 0 | 0 | 1 | 0 | 1 | 0 | 1 | 0 | 1 | 0 |
| 5  | 0 | 0 | 1 | 0 | 1 | 0 | 0 | 0 | 0 | 0 | 0 | 0 | 1 | 1 | 0 | 1 | 0 | 1 | 0 | 1 | 0 |
| 6  | 0 | 0 | 1 | 1 | 0 | 0 | 0 | 0 | 0 | 0 | 1 | 0 | 1 | 1 | 0 | 1 | 0 | 1 | 0 | 1 | 0 |
| 7  | 0 | 0 | 1 | 1 | 1 | 0 | 0 | 0 | 1 | 0 | 1 | 0 | 1 | 1 | 0 | 1 | 0 | 1 | 0 | 1 | 0 |
| 8  | 0 | 1 | 0 | 0 | 0 | 0 | 1 | 0 | 1 | 0 | 1 | 0 | 1 | 1 | 0 | 1 | 0 | 1 | 0 | 1 | 0 |
| 9  | 0 | 1 | 0 | 0 | 1 | 0 | 1 | 0 | 1 | 0 | 1 | 0 | 1 | 1 | 0 | 1 | 0 | 1 | 0 | 0 | 0 |
| 10 | 0 | 1 | 0 | 1 | 0 | 0 | 1 | 0 | 1 | 0 | 1 | 0 | 1 | 1 | 0 | 1 | 0 | 0 | 0 | 0 | 0 |
| 11 | 0 | 1 | 0 | 1 | 1 | 0 | 1 | 0 | 1 | 0 | 1 | 0 | 1 | 1 | 0 | 0 | 0 | 0 | 0 | 0 | 0 |
| 12 | 0 | 1 | 1 | 0 | 0 | 0 | 1 | 0 | 1 | 0 | 1 | 0 | 1 | 0 | 0 | 0 | 0 | 0 | 0 | 0 | 0 |
| 13 | 0 | 1 | 1 | 0 | 1 | 0 | 1 | 0 | 1 | 0 | 1 | 0 | 1 | 0 | 0 | 0 | 0 | 0 | 0 | 0 | 1 |
| 14 | 0 | 1 | 1 | 1 | 0 | 0 | 1 | 0 | 1 | 0 | 1 | 0 | 1 | 0 | 0 | 0 | 0 | 0 | 1 | 0 | 1 |
| 15 | 0 | 1 | 1 | 1 | 1 | 0 | 1 | 0 | 1 | 0 | 1 | 0 | 1 | 0 | 0 | 0 | 0 | 0 | 1 | 0 | 1 |
| 16 | 1 | 0 | 0 | 0 | 0 | 0 | 1 | 0 | 1 | 0 | 1 | 0 | 1 | 0 | 1 | 0 | 1 | 0 | 1 | 0 | 1 |
| 17 | 1 | 0 | 0 | 0 | 1 | 0 | 1 | 0 | 1 | 0 | 1 | 0 | 0 | 0 | 1 | 0 | 1 | 0 | 1 | 0 | 1 |
| 18 | 1 | 0 | 0 | 1 | 0 | 0 | 1 | 0 | 1 | 0 | 0 | 0 | 0 | 0 | 1 | 0 | 1 | 0 | 1 | 0 | 1 |
| 19 | 1 | 0 | 0 | 1 | 1 | 0 | 1 | 0 | 0 | 0 | 0 | 0 | 0 | 0 | 1 | 0 | 1 | 0 | 1 | 0 | 1 |
| 20 | 1 | 0 | 1 | 0 | 0 | 0 | 0 | 0 | 0 | 0 | 0 | 0 | 0 | 0 | 1 | 0 | 1 | 0 | 1 | 0 | 1 |
| 21 | 1 | 0 | 1 | 0 | 1 | 0 | 0 | 0 | 0 | 0 | 0 | 1 | 0 | 0 | 1 | 0 | 1 | 0 | 1 | 0 | 1 |
| 22 | 1 | 0 | 1 | 1 | 0 | 0 | 0 | 0 | 0 | 1 | 0 | 1 | 0 | 0 | 1 | 0 | 1 | 0 | 1 | 0 | 1 |
| 23 | 1 | 0 | 1 | 1 | 1 | 0 | 0 | 1 | 0 | 1 | 0 | 1 | 0 | 0 | 1 | 0 | 1 | 0 | 1 | 0 | 1 |
| 24 | 1 | 1 | 0 | 0 | 0 | 1 | 0 | 1 | 0 | 1 | 0 | 1 | 0 | 0 | 1 | 0 | 1 | 0 | 1 | 0 | 1 |
| 25 | 1 | 1 | 0 | 0 | 1 | 1 | 0 | 1 | 0 | 1 | 0 | 1 | 0 | 0 | 1 | 0 | 1 | 0 | 1 | 0 | 0 |
| 26 | 1 | 1 | 0 | 1 | 0 | 1 | 0 | 1 | 0 | 1 | 0 | 1 | 0 | 0 | 1 | 0 | 1 | 0 | 0 | 0 | 0 |
| 27 | 1 | 1 | 0 | 1 | 1 | 1 | 0 | 1 | 0 | 1 | 0 | 1 | 0 | 0 | 1 | 0 | 0 | 0 | 0 | 0 | 0 |
| 28 | 1 | 1 | 1 | 0 | 0 | 1 | 0 | 1 | 0 | 1 | 0 | 1 | 0 | 0 | 0 | 0 | 0 | 0 | 0 | 0 | 0 |
| 29 | 1 | 1 | 1 | 0 | 1 | 1 | 0 | 1 | 0 | 1 | 0 | 1 | 0 | 0 | 0 | 0 | 0 | 0 | 0 | 1 | 0 |
| 30 | 1 | 1 | 1 | 1 | 0 | 1 | 0 | 1 | 0 | 1 | 0 | 1 | 0 | 0 | 0 | 0 | 0 | 1 | 0 | 1 | 0 |
| 31 | 1 | 1 | 1 | 1 | 1 | 1 | 0 | 1 | 0 | 1 | 0 | 1 | 0 | 0 | 0 | 1 | 0 | 1 | 0 | 1 | 0 |

1/8 STEP TRUTH TABLE
FOR 1/4 STEP Q4 ALWAYS EQUALS 0

FIG. 8

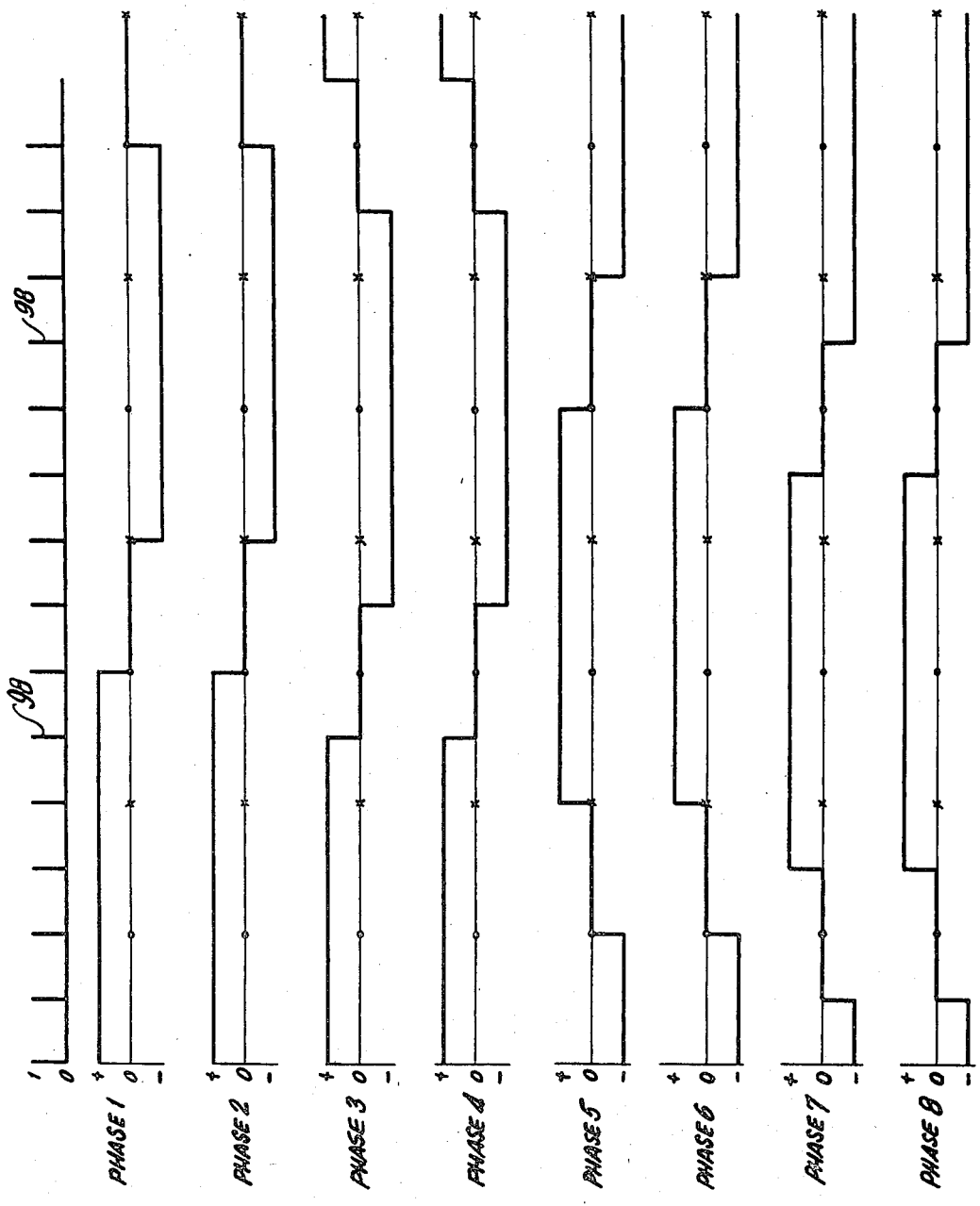

8 PHASE UNIPOLAR

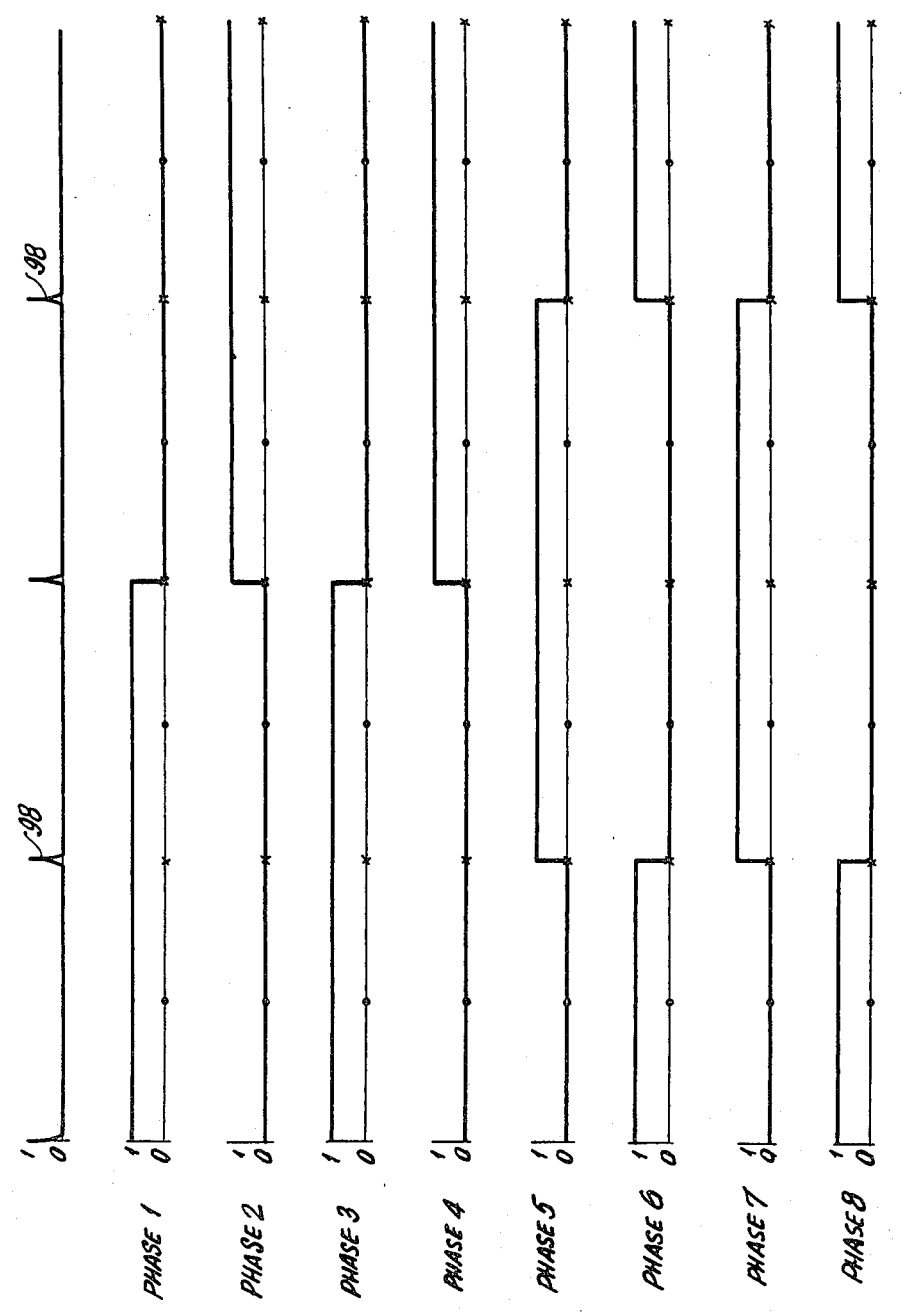

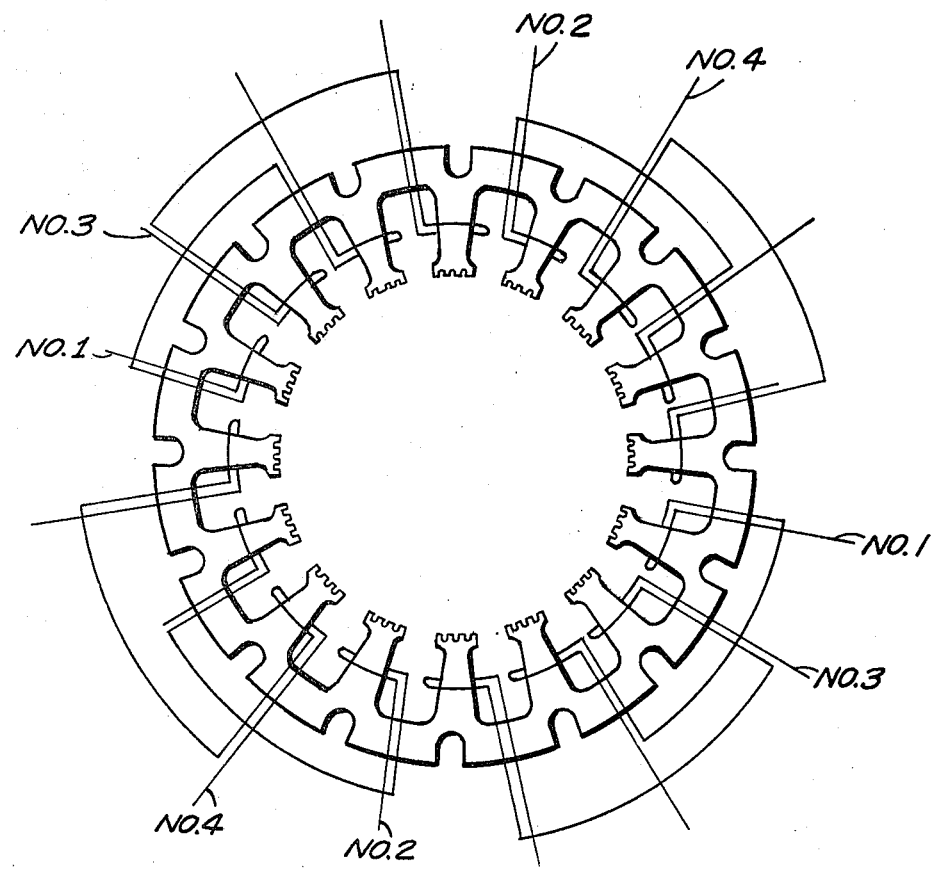
FIG. 25  4 PHASE BIPOLAR
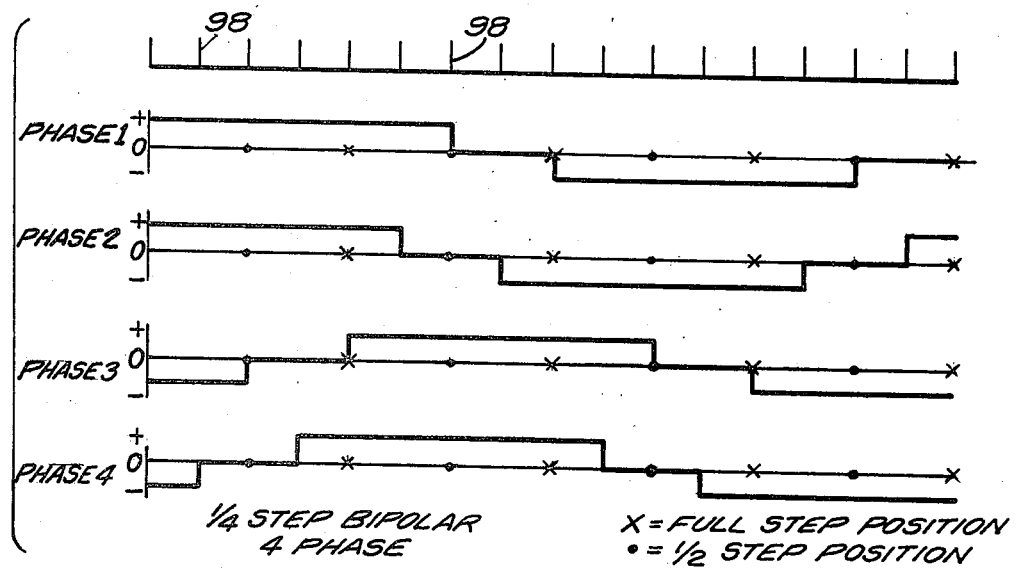
FIG. 26

SYNCHRONOUS MOTOR SYSTEM

BACKGROUND OF THE INVENTION

This invention relates to synchronous motor systems, and particularly, to stepping motors and stepping motor systems.

Stepping motors and their operation are well known. In an article entitled "New Inductor Motor Has Low Speed, Self-Start and High Torque" by J. H. Staak in the June 1947 edition of Electrical Manufacturing, Vol. 39, No. 6, published by the Gage Publishing Co., the author describes an early stepping motor. In such a motor, a rotor composed of two axially displaced sets of permanently-magnetized radially-extending rotor teeth rotates about an axis common to a stator composed of inwardly extending stator poles each having stator teeth. One set of rotor teeth is peripherally displaced relative to the other set by ½ tooth pitch. The stator teeth extend axially across both sets of rotor teeth.

One of the advantages of a stepping motor is its ability to rotate in synchronism with an applied voltage. Another advantage is its ability to "step" or rotate the rotor through a predetermined stepping angle in response to an input voltage or current pulse. This is of special importance where the motor operates in response to digital data. In general, the stepping angle, or the angle of a step, through which a rotor responds to a single pulse is determined by the number of rotor teeth, i.e., the rotor tooth pitch, and by the number of poles. Another advantage of a stepping motor is that it is possible to provide for cogging during rotation or for smooth rotation depending upon the desired application, by selecting a proper stator tooth pitch relative to the rotor tooth pitch.

Stepping motors have a number of disadvantages. The stepping angle is a function of the number of rotor teeth. Thus, the smaller the desired stepping angle, the greater the number of teeth required. Thus, motors requiring very fine resolution require rotors with small teeth. However, the machinery for manufacturing different types of rotors to satisfy the different resolutions is expensive.

Moreover, the pulse generators which are used to drive large motors require power transistors with large current carrying capacities. The current carrying capacities of the transistors used limit the power which can be delivered to the motors. It is difficult to operate transistors in parallel to achieve high power drives, because variations in transistor characteristics may cause the transistors to carry currents unequally and eventually burn out the transistor carrying the highest current.

Furthermore, stepping motors tend to exhibit resonances. It is not known why such resonance exists. It has been suggested that such resonances occur as a result of the starting and stopping shocks during each step. Stepping motors also tend to vibrate.

My copending application, Ser. No. 742,690 describes a stepping motor system whose step angles can be varied even after the motor has been constructed. This is done electronically. However, where very small stepping angles are selected, the rotor must be made stiff to prevent unbalanced radial magnetic forces from rocking the rotor about its axis. In such motor systems, the stator coils must be wound directly about the poles or else the stator coils must be preformed and then deformed during mounting on the poles. This makes manufacture of motor systems of this type comparatively slow and sometimes difficult. This is especially true when heavy wires are used in the coil windings. Such heavy wires are desirable for high speed drive of the motors.

An object of the invention is to improve stepping motors and stepping motor systems.

Another object of this invention is to alleviate the aforementioned disadvantages.

Still another object of the invention is to decrease the step angles available from present stepping motors.

SUMMARY OF THE INVENTION

According to a feature of the invention, these objects are attained, in whole or in part, by forming the motor with a stator in which the number of poles is 16 at regular intervals of 22½°, each having a plurality of teeth offset from the teeth of the poles 90° therefrom by one full tooth pitch, and offset from the teeth on adjacent poles by ¼ pitch.

According to another feature of the invention, each of the poles extends radially inward from a root and ends in a crown at the teeth, with a narrowed section therebetween.

According to another feature of the invention, the distance across the root and the crown is substantially equal in the tangential direction of the rotor.

According to another feature of the invention, the distance across the neck of a pole in the tangential direction is equal to the teeth on the pole in the tangential direction.

According to another feature of the invention, the inner diameter of the stator is substantially equal to ¾ of the outer diameter of the stator.

According to another feature of the invention, the inner dimension of the coils along the tangential direction of the stator is substantially equal to, but can slip over, the crown of a stator pole.

According to yet another feature of the invention, the thickness of a stator coil in the tangential direction of the stator, mounted on each pole, is less than ½ of the distance from the crown of one pole to the neck of the adjacent pole.

According to yet another feature of the invention, the stator coils are prewound and slipped over the stator poles.

According to yet another feature of the invention, the driver of the system successively de-energizes alternate poles and keeps them de-energized and then successively re-energizes alternate poles in the opposite direction. Thereafter, the drive successively de-energizes the poles intermediate the alternate poles and keeps them de-energized until all intermediate poles are de-energized and then successively re-energizes the intermediate poles in the other direction until all intermediate poles are re-energized. This drives the rotor in fractional stages. For larger fractional steps, larger numbers of poles are de-energized in response to each pulse. For even larger fractions, the de-energization process is eliminated.

These and other features of the invention are pointed out in the claims. Other objects and advantages of the invention will become evident from the following detailed description, when read in light of the accompanying drawings.

BRIEF DESCRIPTION OF THE DRAWINGS

In the Drawings:

FIG. 8 is a truth table for the system in FIGS. 6 and 9.

FIG. 14 is a group of graphs illustrating conditions within the motor of FIG. 4 when the driver operates according to one embodiment of the invention.

FIGS. 23 and 24 are groups of graphs illustrating conditions within the motor of FIG. 20 produced by the driver in accordance with another embodiment of the invention.

FIG. 25 is a schematic diagram of a stator of a motor according to another embodiment of the invention.

FIGS. 26 to 28 are groups of graphs showing the various energizations of windings in the motor of FIG. 25 under different conditions.

DESCRIPTION OF PREFERRED EMBODIMENTS

Figure 1:
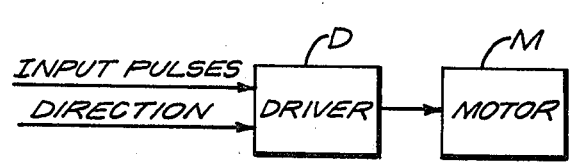
FIG. 1 is a block diagram of a system which embodies features of the present invention and whose details appear in other figures.

In FIG. 1, a driver D receives control pulses from an external source (not shown) and drives a motor M. The driver D also receives an external rotation direction signal which instructs the driver D to rotate the motor in one or the other direction.

Figure 2:
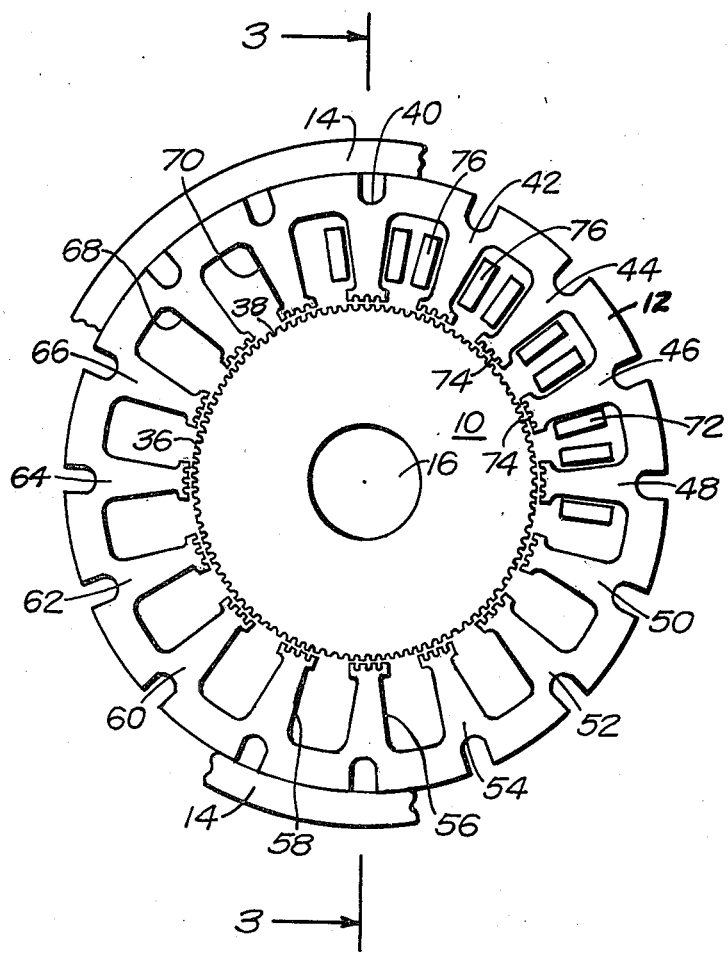
FIG. 2 is a section of the motor in FIG. 1 and specifically a section 2—2 of the motor in FIG. 3.
Figure 3:
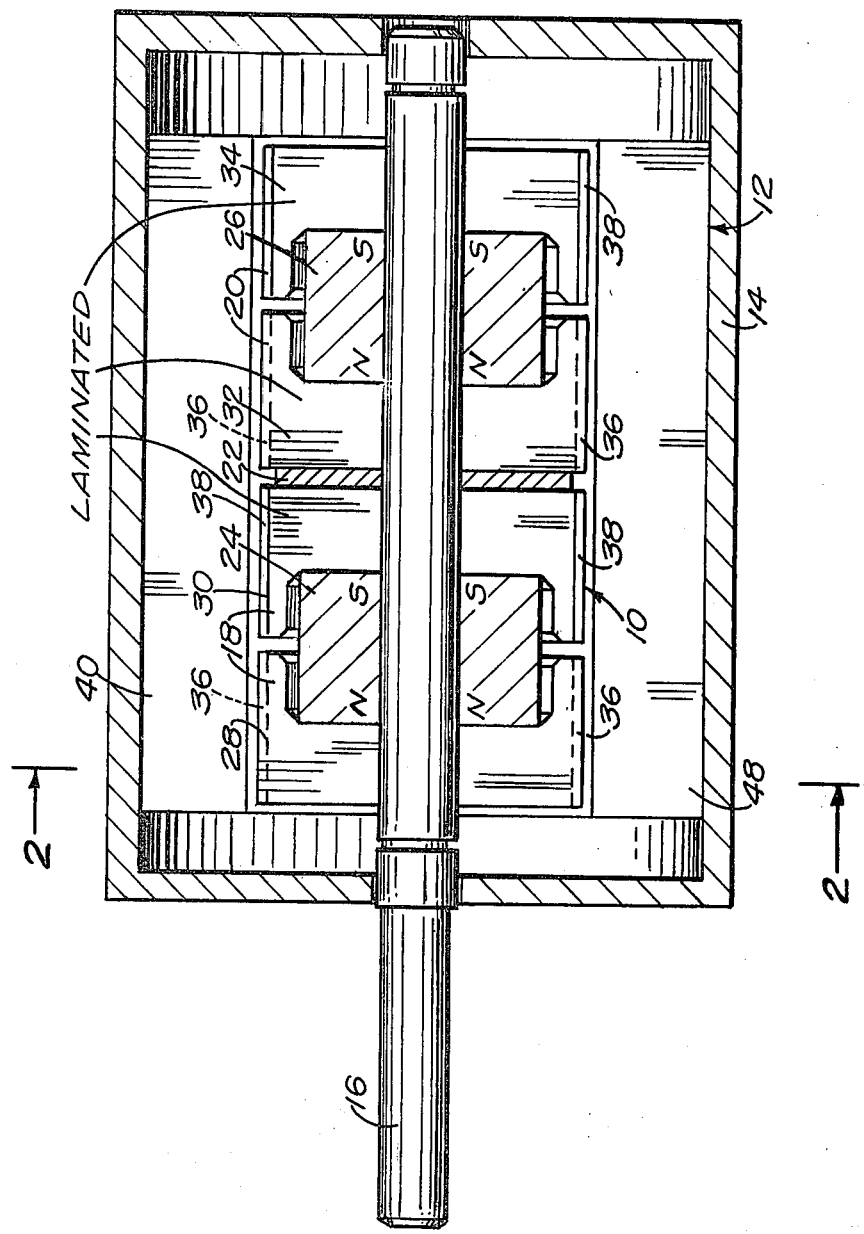
FIG. 3 is a section 3—3 of the motor in FIG. 2.

The motor M appears in more detail in FIGS. 2 and 3. Here, a rotor 10 rotates within a stator 12 mounted within a housing schematically shown as 14. A shaft 16 projects through the housing and is keyed to the rotor 10 for rotation therewith. Suitable bearings not shown mount the rotor 10 and the shaft 16 so as to be rotatable within the housing 14. The stator is laminated of laminae transverse to its axis.

As specifically shown in FIG. 3, the rotor 10 is composed of two identical, axially spaced, rotor sections 18 and 20. A non-magnetic spacer 12 separates the sections 18 and 20 from each other. Forming sections 18 and 20 are respective permanent magnets 24 and 26 axially magnetized in the directions shown. Four capped-shaped rotor pole shoes 28, 30, and 32, 34 encapsulating the respective magnets 24 and 26 at their axial ends form front and rear rotor segments in each rotor section with their permanent magnets. The pole shoes 28, 30, 32, and 34 are laminated with laminae in planes transverse to the rotary axis and, for simplicity, are also referred to as rotor segments. As more particularly shown in FIG. 2, the rotor segment 28 carries one hundred peripherally spaced teeth 36 projecting radially outward. Of course, the number of teeth shown is only an example. Other embodiments of the invention utilize pole shoes with other numbers of teeth, such as eighty or nine-six. In the example shown, the angular or peripheral tooth pitch, that is, the angular distance between like points on adjacent rotor teeth 36 is 3.6°. As is readily ascertainable from FIG. 3, the entire segment 28 is magnetized by the permanent magnet 24 to exhibit a north polar magnetization. Although not shown, the teeth 36 are spaced about the entire periphery of the rotor segment 28. The teeth extend longitudinally along the axial direction of the rotor. The rotor segment 30 is identical to the segment 28 and carries outwardly directed peripherally spaced radial teeth 38. However, the segment 30 is mounted on or keyed to the shaft 16 so that the rotor teeth 38 are angularly offset from the rotor teeth 36 by one-half tooth pitch and so they appear, looking axially, midway between the teeth 36. This is shown most precisely in the left hand portion of the rotor in FIG. 2. For simplicity, the rotor teeth 38 sticking out behind the rotor teeth 36 are not illustrated in the remainder of the rotor. However, it should be understood that rotor teeth do in fact exist in these locations behind the rotor segment 38. For simplicity, the teeth and the segments 32 and 34 of section 20 are identified with the same reference numerals as the teeth in the segments 28 and 30 of the section 18. Sections 18 and 20 are identical and their teeth aligned.

As shown in FIG. 2, sixteen angularly displaced poles 40, 42, 44, 46, 48, 50, 52, 54, 56, 58, 60, 62, 64, 66, 68, and 70 project inwardly from a common circumscribing stator portion 72 to form the stator 12. The poles extend longitudinally along the entire axial dimension of the stator 12 beyond the rotor 10. Four stator pole teeth or stator teeth 74 form the inner radial ends of each pole 40 to 70. The pole teeth are formed along an imaginary cylindrical surface coaxial with the rotor and spaced slightly from the rotor teeth 36 and 38. In the embodiment shown, the pole teeth are pitched at 3.6 degrees. Thus, they have the same pitch as the rotor teeth 36 and 38. According to other embodiments, the rotor teeth have different pitches. In this embodiment, the rotor tooth pitch and the stator tooth pitch are the same. In others, they are different. The poles 40 to 70 and their respective teeth 74 are angularly arranged so that the teeth on poles 90° and 180° from each other, such as 40, 48, 56 and 64, can directly oppose the rotor teeth 36 on one pole shoe when teeth on poles 44, 52, 60, and 68 forty-five degrees therefrom are completely out of alignment with the teeth 36 on the same pole shoe. The teeth 74 on the remaining 22.5 degree angularly oriented poles 42, 46, 50, 54, 58, 62, 66, and 70 are angularly arranged so that they are ninety degrees and 270 degrees out of phase with the angular alignment of the rotor teeth 36 of the same pole shoe, in the same position. That is to say, the teeth on adjacent poles are offset from each other by one-quarter tooth pitch; on the alternate poles by one-half tooth pitch; and on the perpendicular poles by a full tooth pitch.

The pole teeth 74 extend longitudinally parallel to the rotor axis from one end of the rotor 10 to the other. Thus, when the teeth 74 on the poles 44, 52, 60, and 68 are 180 degrees out of alignment with the teeth 36 of the segment 28 (offset by ½ tooth pitch), they are completely aligned with the teeth 38 on the segment 30. At the same time, the teeth 74 on the poles, 40, 48, 56, and 64 are completely out of alignment with the teeth 38.

Stator coils 76 magnetize the poles 40 to 70 in a sequence that causes rotation of the rotor. Details of the stator coils 76 and their arrangement on the stator appear schematically in FIG. 4. Here, the sixteen coils are formed of sixteen respective windings 82, 84, 86, 88, 90, 92, 94, 96, 98, 100, 102, 104, 106, 108, 110, and 112, each representing one of sixteen phases P1 to P16.

Figure 4:
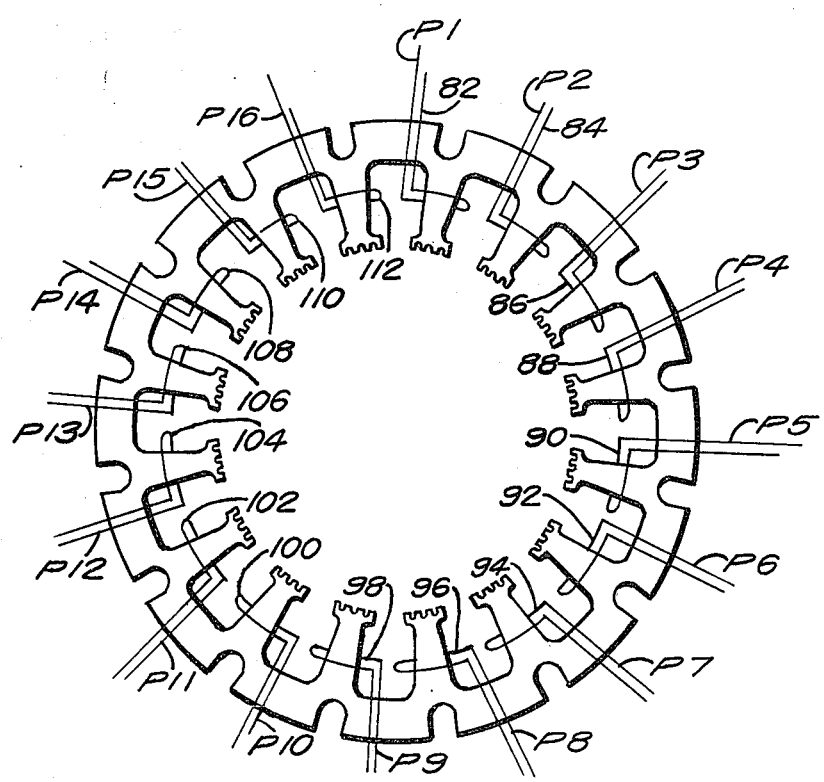
FIG. 4 is a drawing showing details and dimensions of a portion of the rotor in FIG. 1.
Figure 4A:
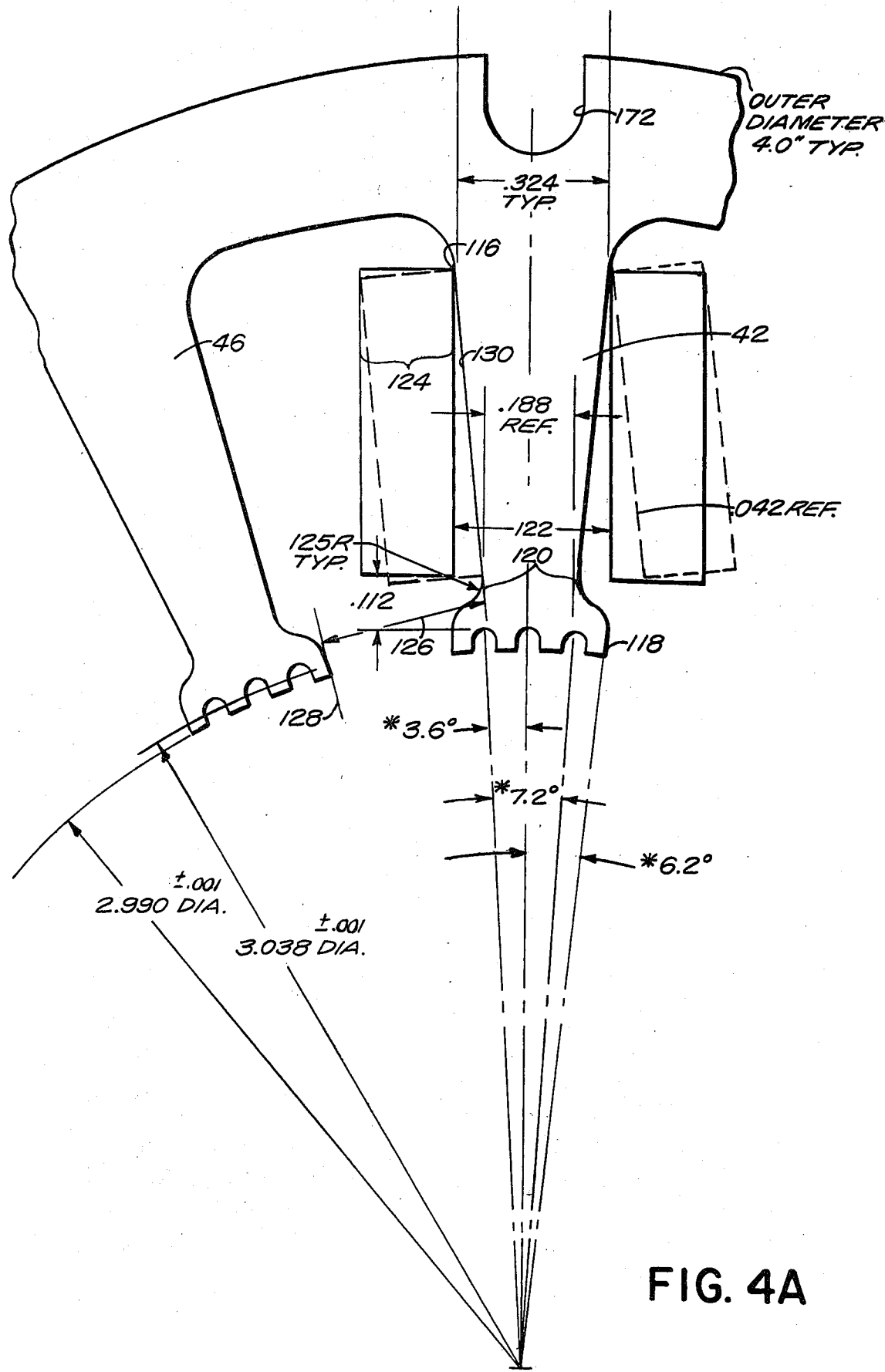

The dimensions of two adjacent stator poles 42 and 46 are shown in FIG. 4A. Here, the dimension at the root 116 of the stator pole is equal to the dimension at the crown 118 of the stator pole. Furthermore, the dimension across the neck 120 of the pole is equal to the sum of the dimensions of the teeth 74 on that pole. The equality of dimension 120 and those of the teeth allow the magnetic flux applied by the stator coils 76 to pass through the neck 120 to the teeth without excessive compression thereof and change in pole reluctance. The coil 76 surrounding the pole 42 is preformed to have an inner dimension slightly larger than the dimension at the root 116 and the crown 118. The coil 76 has a thickness 124 slightly less than one-half the dimension between the neck 120 of the pole 42 and a line 128 passing through the edge of the crown 118 on the pole 42 and extending parallel to the edge 130 of the pole 42. This allows a coil 76 to be mounted on any pole despite the existence of another coil on adjacent poles by pressing the coils 76 already mounted on their pole against the pole edge 130 (as shown in phantom lines in FIG. 4A) while the new coil 76 is mounted on its pole. At the same time, the inner dimension of the coil allows it to be slipped over the pole crown 118 at the teeth until it abuts against the pole root 116.

The motor of FIGS. 1 to 4 and 4A may be driven by energizing the poles 40 to produce a magnetic North (N) and South (S) pole sequence of N-N-S-S-N-N-S-S-N-N-S-S-N-N-S-S from one pole to the peripherally adjacent pole. The driver D then responds to a pulse to change the magnetization sequence of the same poles to S-N-N-S-S-N-N-S-S-N-N-S-S-N-N-S, and to the next pulses to change the sequences to S-S-N-N-S-S-N-N-S-S-N-N-S-S-N-N, and N-S-S-N-N-S-S-N-N-S-S-N-N-S-S-N . . . etc. As a result, the rotor 10 turns approximately ½ rotor tooth pitch, i.e., one-quarter of the angular distance between corresponding portions of adjacent rotor teeth, in response to each pulse. Hence, each pulse moves the resultant magnetic vector 22.5° but moves the rotor only ¼ rotor tooth pitch. This quarter rotor tooth pitch is referred to as one rotor step. With stator teeth pitched at 3.6° and the 100 tooth rotor 10 shown, the rotor executes 400 steps per revolution.

Figure 5:
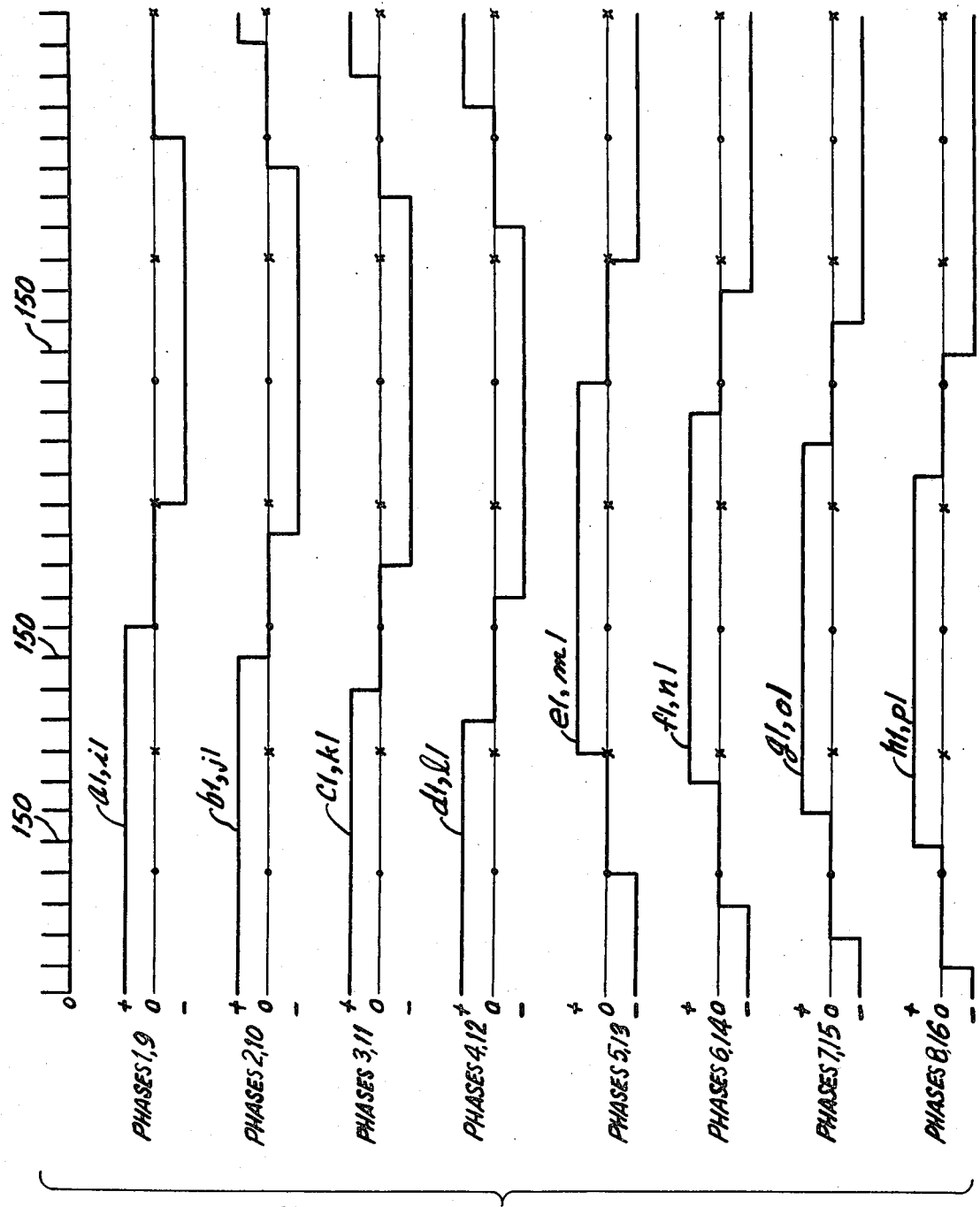
FIG. 5 is a plurality of graphs illustrating the currents applied through the windings of the motor in FIG. 2.

The motor disclosed in FIGS. 1 to 4 and 4A and embodying the invention, may also be driven by having the driver D respond to successive pulses 150 of FIG. 5 and generate the voltages a1 and p1 and apply them to the windings 82 to 112. This moves the rotor 10 ⅛th step or 1/32 rotor tooth pitch for each pulse 150.

Figure 6:
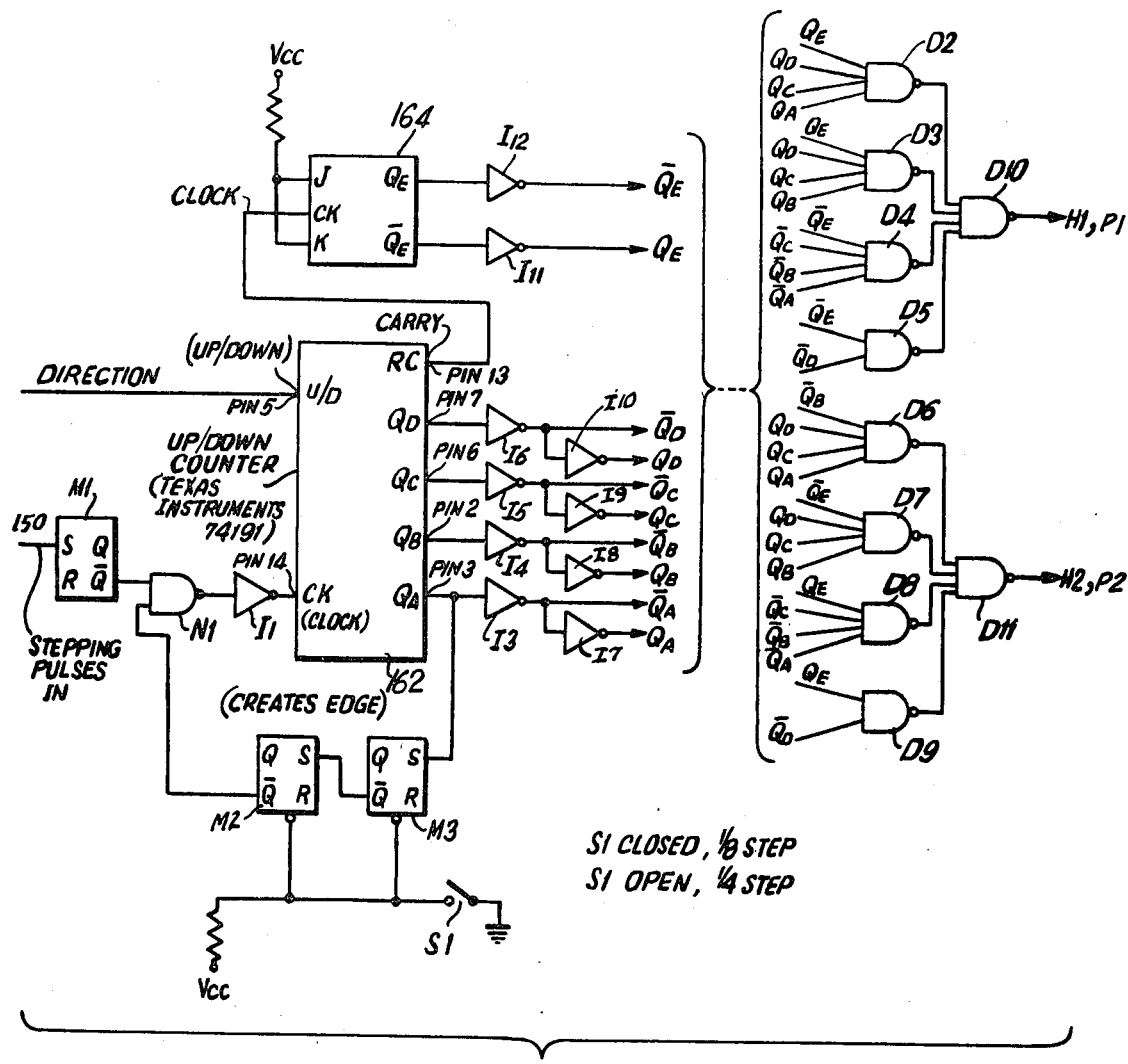
FIG. 6 is a schematic diagram illustrating details of the driver in FIG. 2.
Figure 7:
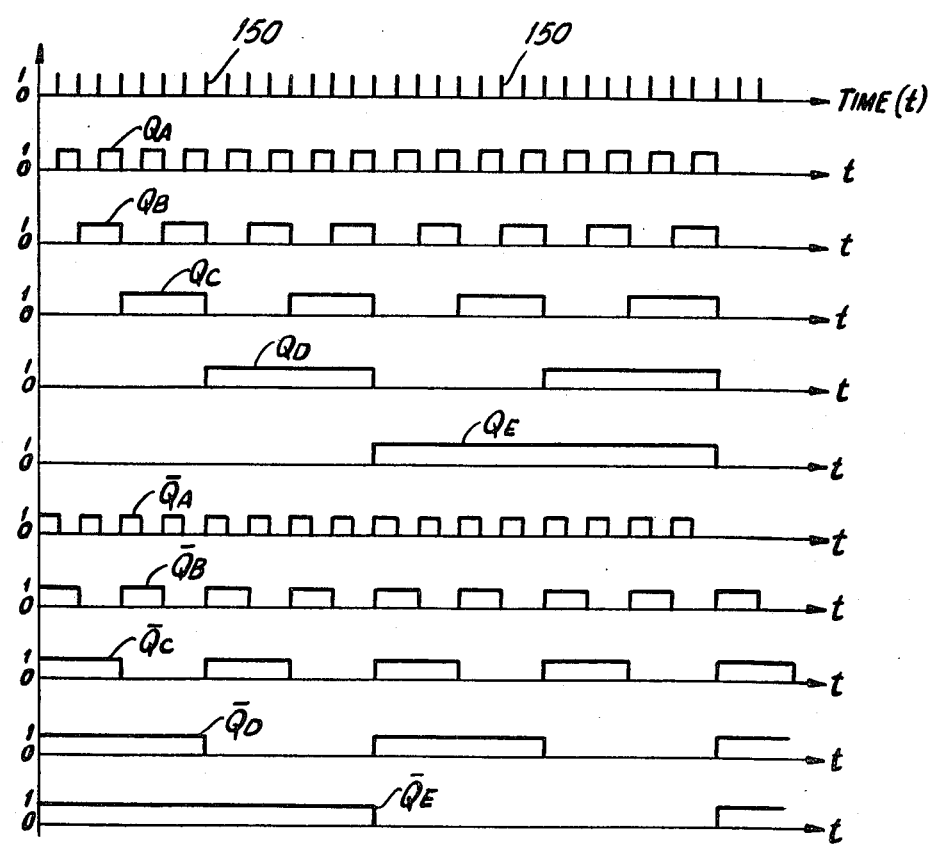
FIG. 7 is a group of graphs illustrating voltages appearing at points in FIG. 6.

Details of the driver D appear schematically in FIGS. 6, 7, and 8. In FIG. 6, pulses 150 from an external source are applied to a monostable multivibrator M1. The latter produces inverse pulses. Whenever a zero or low appears, a NAND gate N1 applies the signal through a second inverter I1 to a dividing circuit 162. The latter is in the form of an up-down counter. In the dividing circuit 162, an output $Q_A$ produces a pulse in response to every second pulse applied at the input CK. An output $Q_B$ produces a pulse for every four pulses at the input. An output $Q_C$ produces a pulse for every four pulses at the input. An output $Q_D$ produces a pulse for every 16 pulses. The divider 162 is composed of an integrated circuit chip. A fifth output of the divider 162 applies every 16th pulse to a reset terminal of a JK flip-flop 164 which again divides the input pulses so that at the terminal $Q_E$ there exists an output for every 32 input pulses. The flip-flop 164 and the divider 162 could have been a single unit. However, the divider 162 which divides by 2, 4, 8, and 16 is more conveniently available as a semi conductor chip. The flip-flop 164 was added to provide the extra division function. A second ouput $\overline{Q_E}$ produces the inverse of the output $Q_E$.

Inverters I3 through I6 invert the outputs at $Q_A$ through $Q_D$ to produce outputs $\overline{Q_A}$, $\overline{Q_B}$, $\overline{Q_C}$, and $\overline{Q_D}$. Inverters I7, I8, I9, and I10 again invert the already inverted Q outputs to recreate the outputs $Q_A$, $Q_B$, $Q_C$ and $Q_D$. The purpose of inverting the Q outputs of the divider 162 is to isolate the circuitry of the divider 162 from the following circuitry. Similarly, inverters I11 and I12 forming the outputs $Q_E$ and $\overline{Q_E}$ isolate the outputs of the flip-flop 164 from subsequent circuitry. The input voltage 98 and the outputs $Q_A$ through $Q_E$ and $\overline{Q_A}$ through $\overline{Q_E}$ appear in FIG. 7. The conditions of $Q_A$ through $Q_E$ also appear in the truth table shown in FIG. 8 in five columns at the left of the table. The first column headed "State" constitutes a count of the pulses 150.

In FIG. 6, the voltages $Q_A$ through $Q_E$ are connected to the inputs of eight NAND gates D2 through D9. The actual connections are not shown in order to avoid confusion which the large number of lines would produce. However, in the NAND gate D2, the four inputs are connected to the output $Q_E$ of inverter I11, the output $Q_D$ of the inverter I10, the output $Q_C$ of the inverter I9, and the output $Q_B$ of the inverter I7. That is, each input of the NAND gate D2 is connected to the output of the inverter I3 through I12 having the corresponding designation. Similarly, the inputs of NAND gates D3 through D9 are provided with specific designations and are connected to the outputs of the inverters I3 through I12 having the corresponding designations. The NAND gates D2 through D9 each produce a zero or low in response to the voltage at all of the inputs being 1 or high. When a zero appears at the output of any of the NAND gates D2 through D5, a 1 appears at the output of a NAND gate D10. Similarly, a zero appearing at the output of any one of the NAND gates D6 through D9 produces a 1 at the output of a NAND gate D11.

Figure 9:
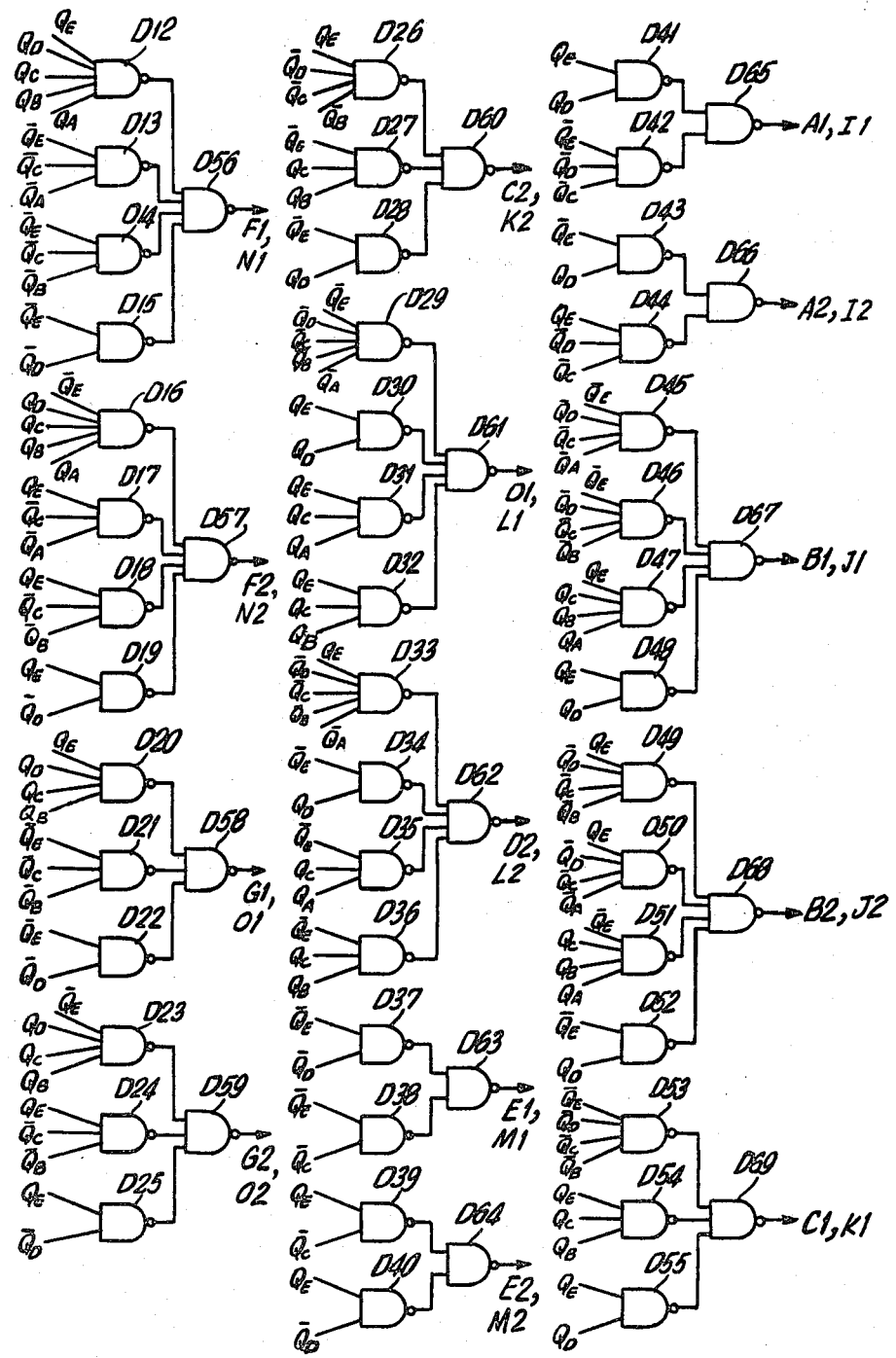
FIG. 9 is a schematic logic diagram illustrating further details of the driver in FIG. 1.

FIG. 9 also forms part of the driver D. Here, NAND gates D12 through D55 are also connected as indicated to the outputs of inverters I3 through I12. Each input to the NAND gates D12 through D55 is marked with a Q and a subscript or a Q with a subscript and is connected to the output of the inverters I3 through I12 carrying the corresponding designation. Each of the NAND gates D12 through D55 produces a zero output in response to all of its inputs being 1 in a manner similar to that discussed with respect to NAND GATES D2 through D9.

NAND gates D56 through D69 connect to the outputs of the NAND gates D12 through D55 as shown and each produces a 1 in response to any of its inputs carrying a zero. This corresponds to the operation of the NAND gates D10 and D11. The outputs of the NAND gates D10, D11, and D56 through D69 are designated A1, A2, through P1, P2. FIG. 8 is a truth table of the outputs appearing at A1, A2 through P1, P2 for the various conditions which occur through the first 32 pulses 150 and the various conditions of $Q_A$ through $Q_E$.

Figure 10:
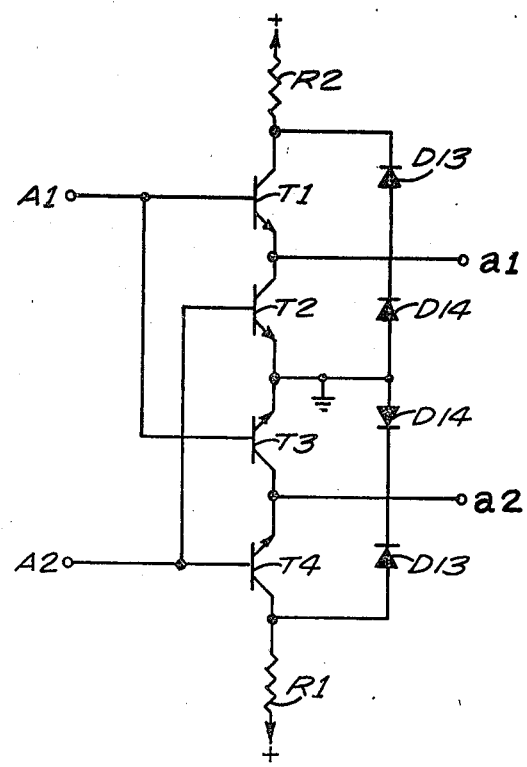
FIG. 10 is a schematic diagram of further details of the drivers in FIG. 1.

A power circuit shown in FIG. 10 connects the outputs A1 and A2 to the ends a1 and a2 of the winding 82. Here, four transistors have their emitter-collector paths connected in series with each other and with two resistors R1 and R2. When the voltage a1 is positive, the voltage at a2 is zero. Similarly, when the voltage at a2 is positive, the voltage at a1 is zero. However, a zero voltage can exist at both a1 and a2.

When the voltage at A1 is positive, transistors T1 and T3 conduct. This forms a current path from the positive source through the resistor R2, the transistor T1, the windings between the terminals a1 and a2, the transistor T3 at ground. When A2 is 1, transistors T2 and T4 conduct and form a current path from the positive supply through the resistor R1, the transistor T4, the winding between the terminals a2 and a1, the transistor T2 to ground. In this second case, the current flow through the winding occurs from a2 to a1. This contrasts with the condition when A1 is 1 during which time current flows from a1 to a2.

Identical circuits to that in FIG. 10 appear across the respective pair of leads B1 and B2, C1 and C2 ... P1 and P2. These are respectively connected to the pairs of winding ends b1 and b2, c1 and c2, ... p1 and p2. The resulting currents in the windings of FIG. 4 are the ones shown in FIG. 5.

From FIG. 5, it can be seen that during the first step, each of the windings is energized. This creates a summation of magnetic forces which produces an equilibrium position for the rotor relative to the stator teeth. During the second step, i.e., the second pulse 150, one of the windings is de-energized. This changes the equilibrium position and causes the rotor to move 1/32 of a rotor tooth pitch. During the next two steps, other windings are progressively de-energized. Then, a previously de-energized winding h1 is re-energized in the opposite direction and another winding de-energized. This progression shifts the rotor 1/32 of a tooth pitch during each step.

Figure 11:
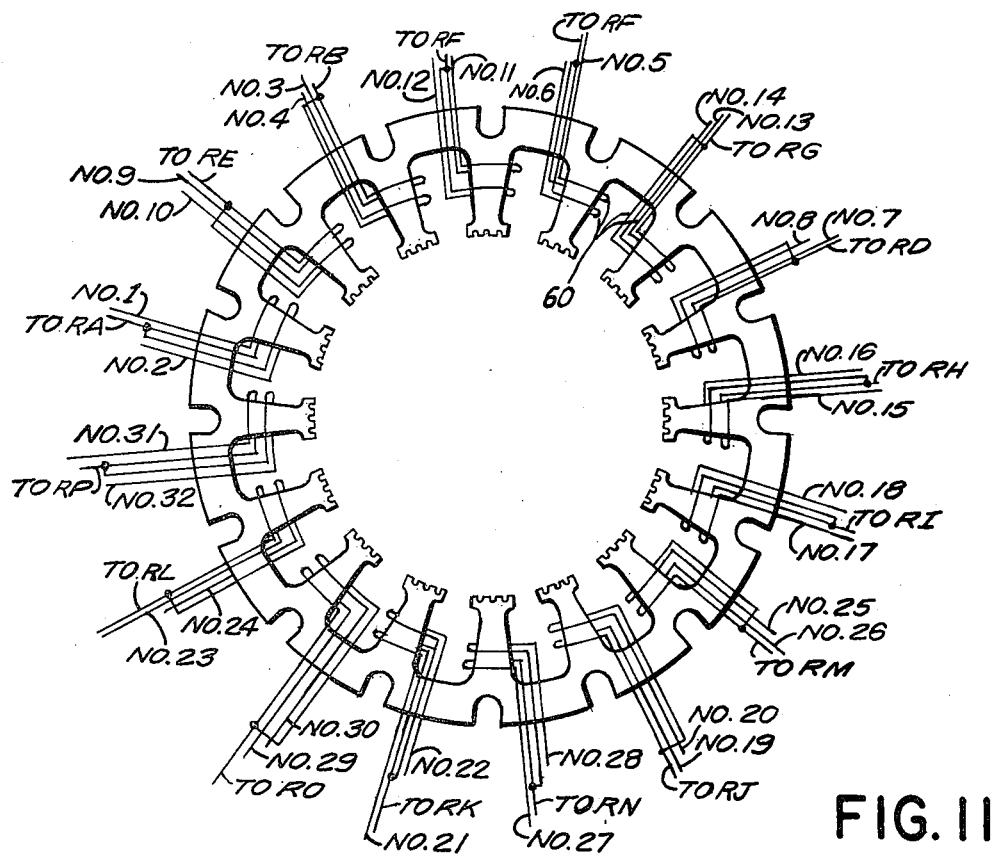
FIG. 11 is a schematic diagram of a winding arrangement of another motor embodying features of the invention.

FIG. 11 illustrates another embodiment of the invention. Here, the coils 60 are each composed of two windings identified as phases 1 to 32. Coupling the windings in FIG. 11 to the logic outputs of NAND gates D10, D11, and D56 through D69 is a power circuit 166 (FIG. 12) composed of eight sections PA through PP. In each section, two transistors T10 and T11 receive logic signals from the terminals indicated. When the transistor T10 of any section is turned on, current flows from the source B+ through a resistor RA-RP through the winding of the odd numbered phase such as phase 1, and through the transistor T10 to ground. Similarly, when the transistor T11 of any of the sections PA to PP is turned on, current flows from the source B+ through the resistor RA-RP, through the even numbered phase winding to which it is connected, through the transistor T11 to ground. The diodes D11 and D12 form a current path for reverse currents generated by each winding when the winding is unenergized and the field of the winding collapses. Diodes D13 and D14 in FIG. 10 perform the same function.

Figure 13:
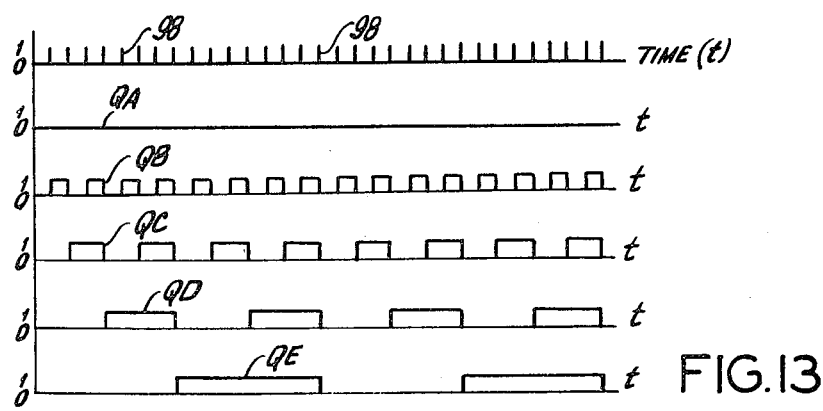
FIG. 13 illustrates a group of graphs illustrating operation of the circuit in FIG. 6 when the circuit is operated in an alternate mode.
Figure 13A:
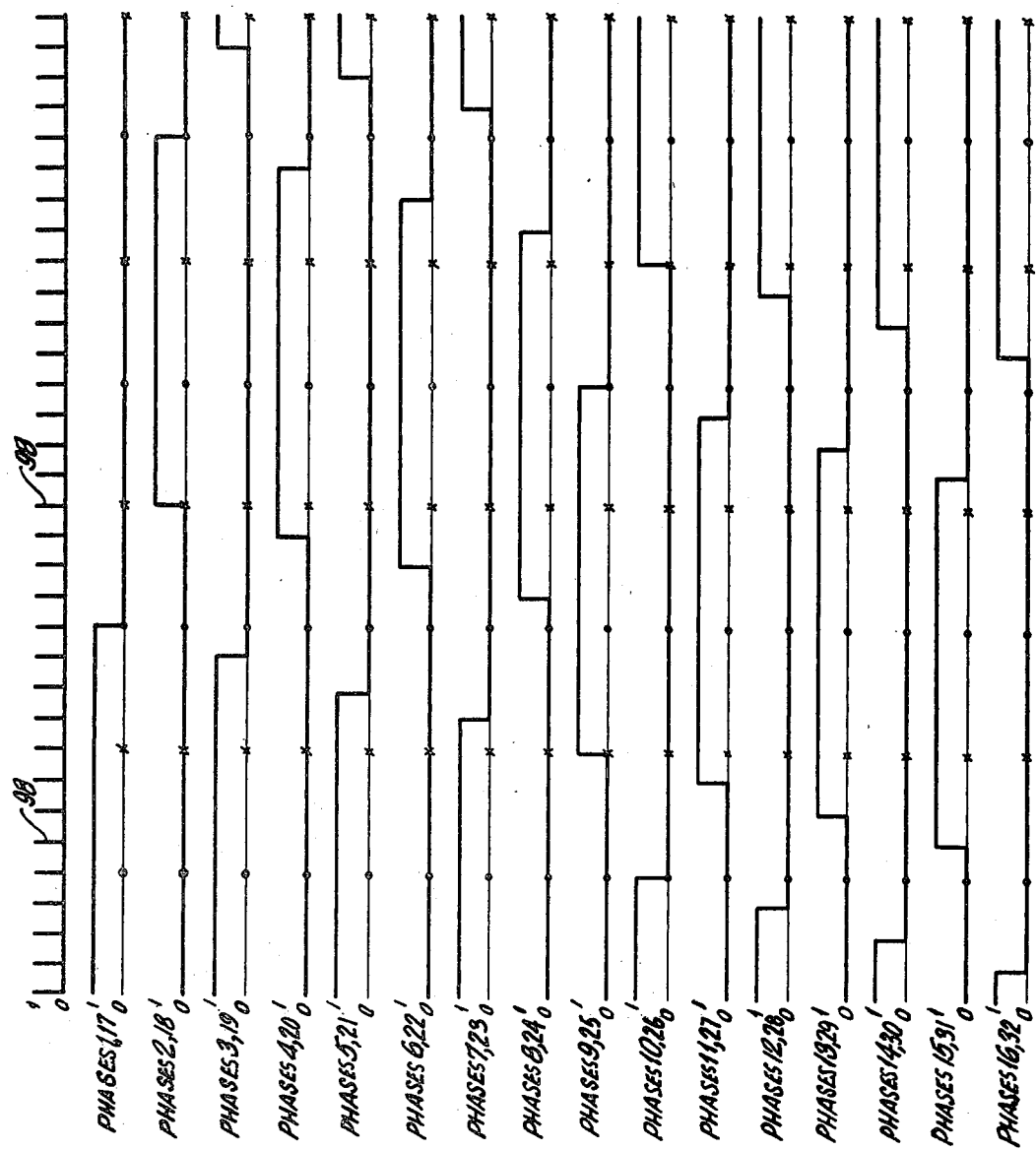
FIG. 13a is a group of graphs illustrating current and voltage conditions in the motor of FIG. 11 when operated according to one embodiment of the invention.

FIG. 13A illustrates the voltages applied to the particular windings as a result of the pulses 150 applied to the input.

It can be seen, that each pole has at least one winding energized during the first step. For the next four steps, one pole after another is depolarized until the winding 15 reverses the polarity in that pole while still another pole is unpolarized. This process continues and effectively moves the rotor by 1/32 rotor tooth pitch in response to each pulse 150. The operation of FIG. 11 differs from that of FIG. 4 in that the reverse voltages and currents which appear in FIG. 5 and are applied to the winding, occur as forward voltages and currents. However, in FIG. 11, each pole has two windings. One of the windings on each pole receives only what would have been the forward voltages and currents in FIG. 5. The other winding on each pole of FIG. 11 receives only what would have been the reverse voltages and currents of FIG. 5, but receives them as positive voltages and currents. However, this other winding is energized in the reverse direction from the first winding of that pole. Thus, a forward current through that winding magnetizes the poles in the opposite direction from the magnetization produced by the current in the first winding of that pole.

According to another embodiment of the invention, the driver D illustrated in FIGS. 6 and 7 can also drive the motor of FIG. 4 to respond to the input voltage 150 and rotate the rotor 1/16 rotor tooth pitch for every pulse. This is accomplished by opening the switch S1 of FIG. 6. The switch S1 is normally closed for the 1/32 rotor tooth pitch rotation, which closing disables two monostable multivibrators M2 and M3. When the switch S1 is opened, the multivibrators respond to the leading edge of the output at $Q_A$ and produce a very narrow pulse which is reapplied by the NAND gate N1 and the inverter I1 to the clock input of the divider 162. This immediately shifts the divider to divide by 4 during the remainder of the first pulse. As a result, an output pulse is started at $Q_B$. The output at $Q_A$ is effectively smoothed by the inverters I3 and I7. The results at these outputs appear in FIG. 13. The voltage at $Q_A$ is substantially always at zero. The outputs $Q_B$, $Q_C$, $Q_D$, and $Q_E$ all correspond to what was formerly $Q_A$ through $Q_D$. The resulting voltages at NAND gates D10, D11, and D56 through D69 produce outputs from the circuit of FIG. 10 as shown in FIG. 14. This moves the rotor $\frac{1}{4}$ step, i.e., 1/16 rotor tooth pitch. Two phases are energized identically.

Figure 15:
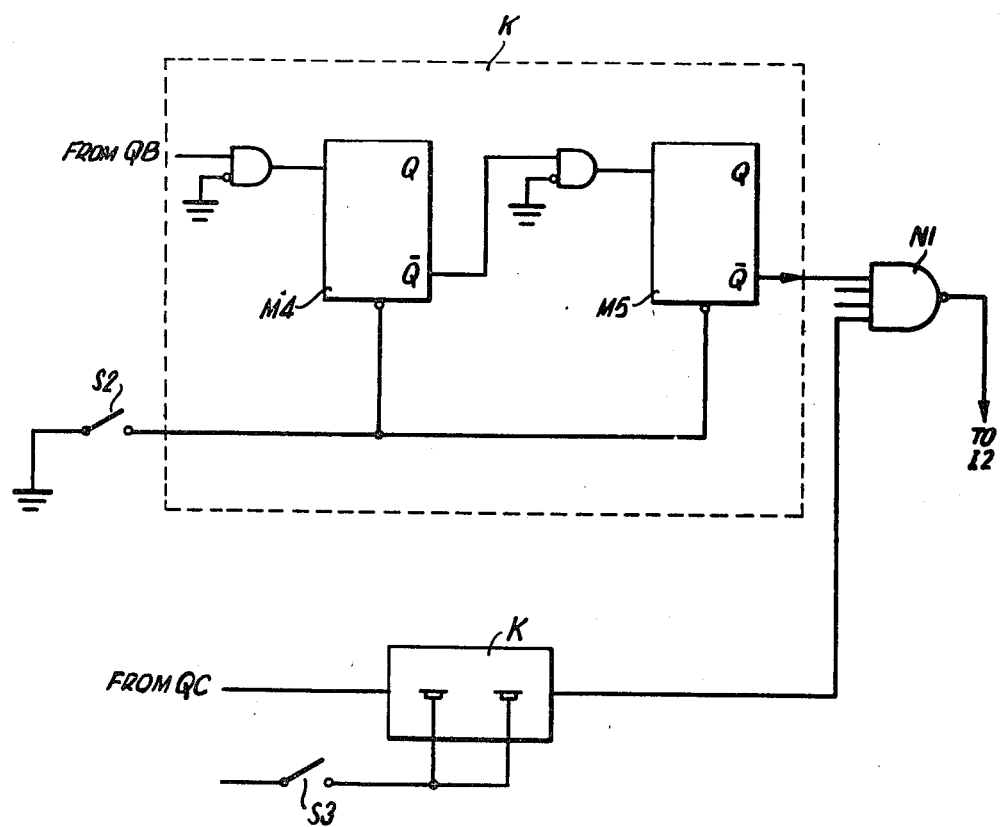
FIG. 15 is a schematic and partial diagram of further details of the driver in FIG. 1 for operating according to still another embodiment of the invention.
Figure 16:
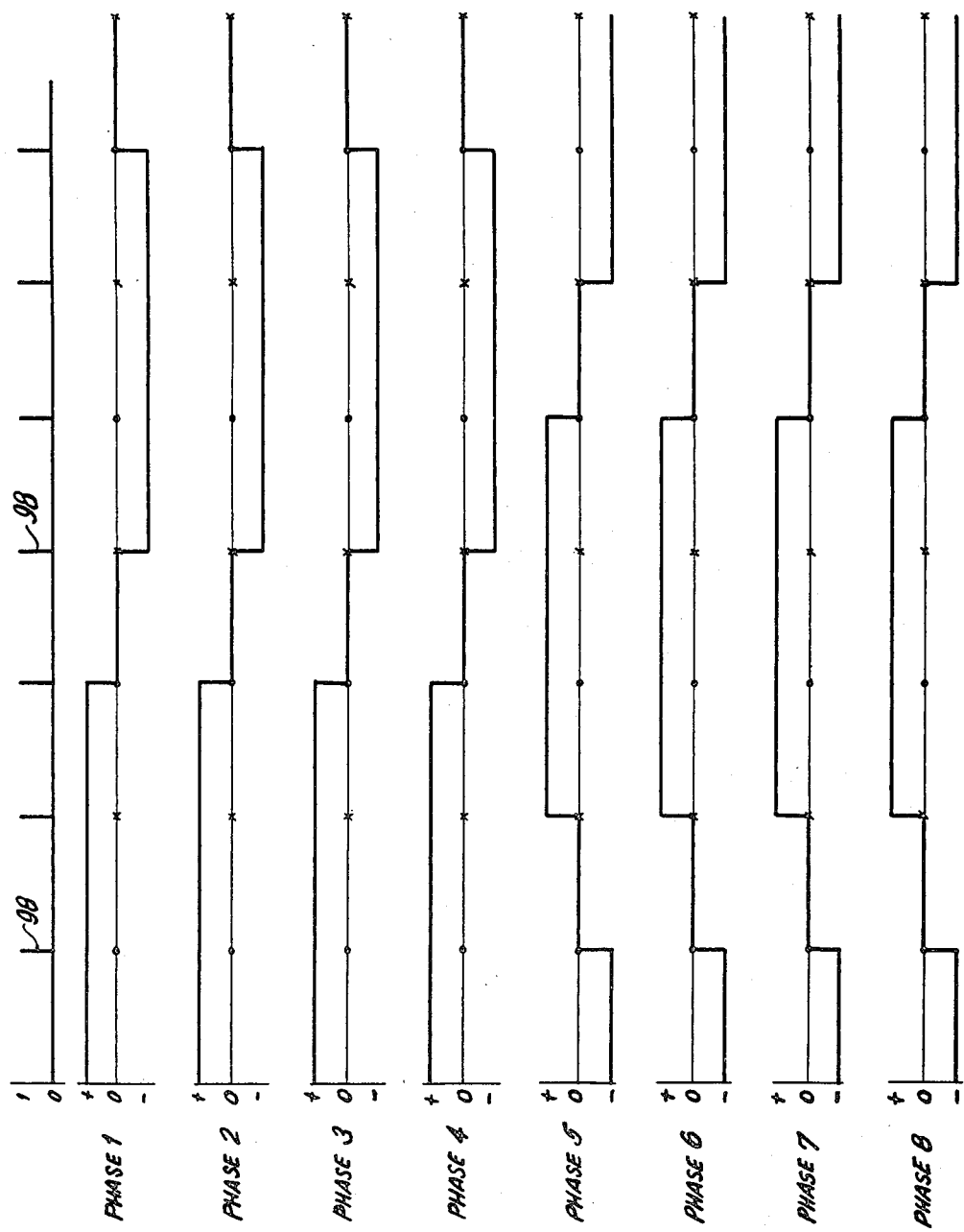
FIG. 16 shows a group of graphs illustrating energization of the motor in FIG. 4 according to yet another embodiment of the invention.
Figure 17:
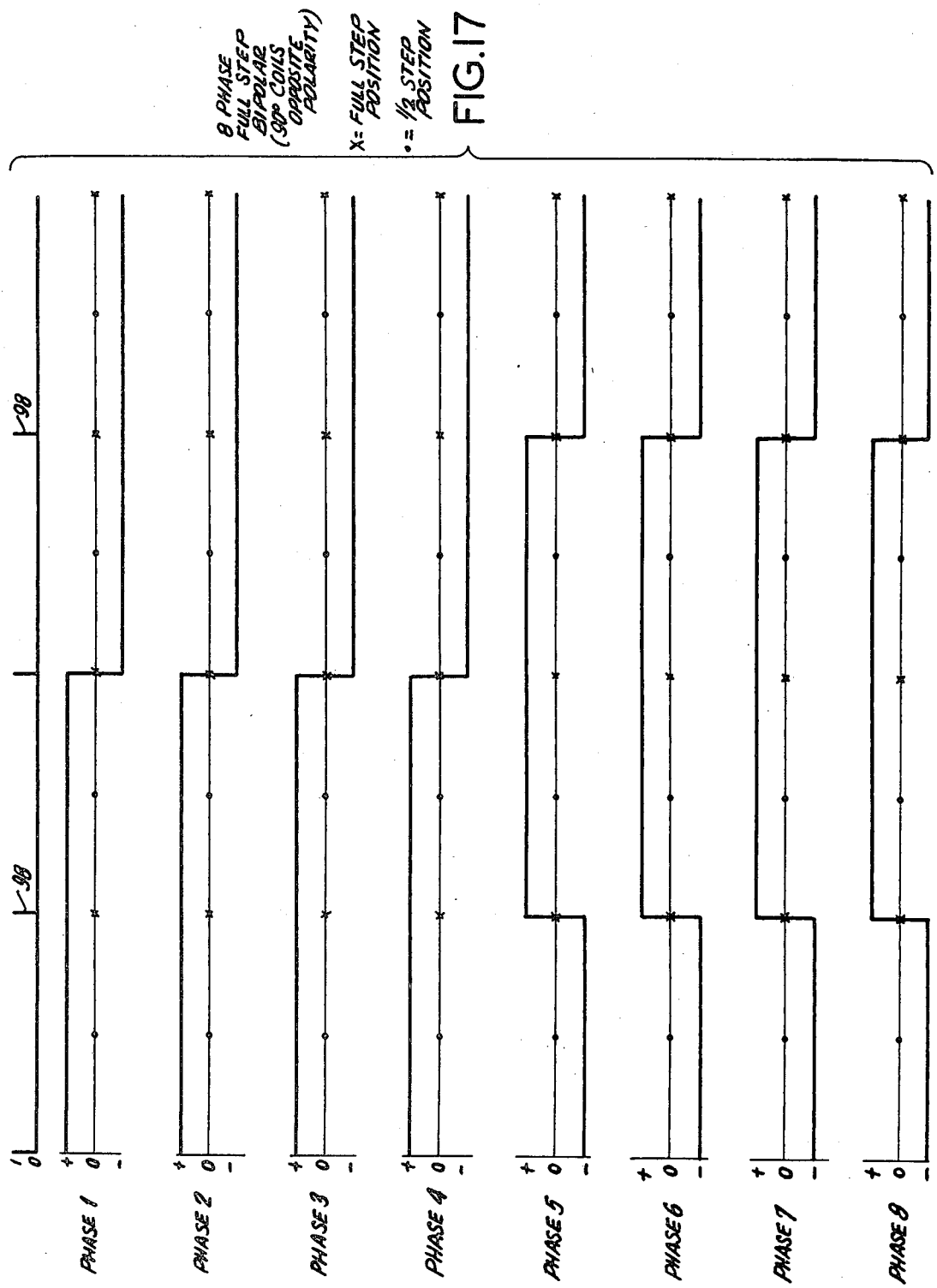
FIG. 17 illustrates a group of graphs showing conditions within the motor of FIG. 11 according to still another embodiment of the invention.

Half steps can be produced with the structures of FIGS. 4, 6, and 7 by coupling the output $Q_B$ to a third input of the NAND gate N1 through two more monostable multivibrators M4 and M5 as shown in FIG. 15. These multivibrators form a circuit K. A switch S2 when closed inhibits operation of the circuit K and causes the system to operate at a $\frac{1}{4}$ step. A full step can be achieved by adding a second circuit K to the terminal $Q_C$ and another input of the NAND gate N1. Half-step and full-step bipolar energization of the windings are shown in FIGS. 16 and 17.

Figure 18:
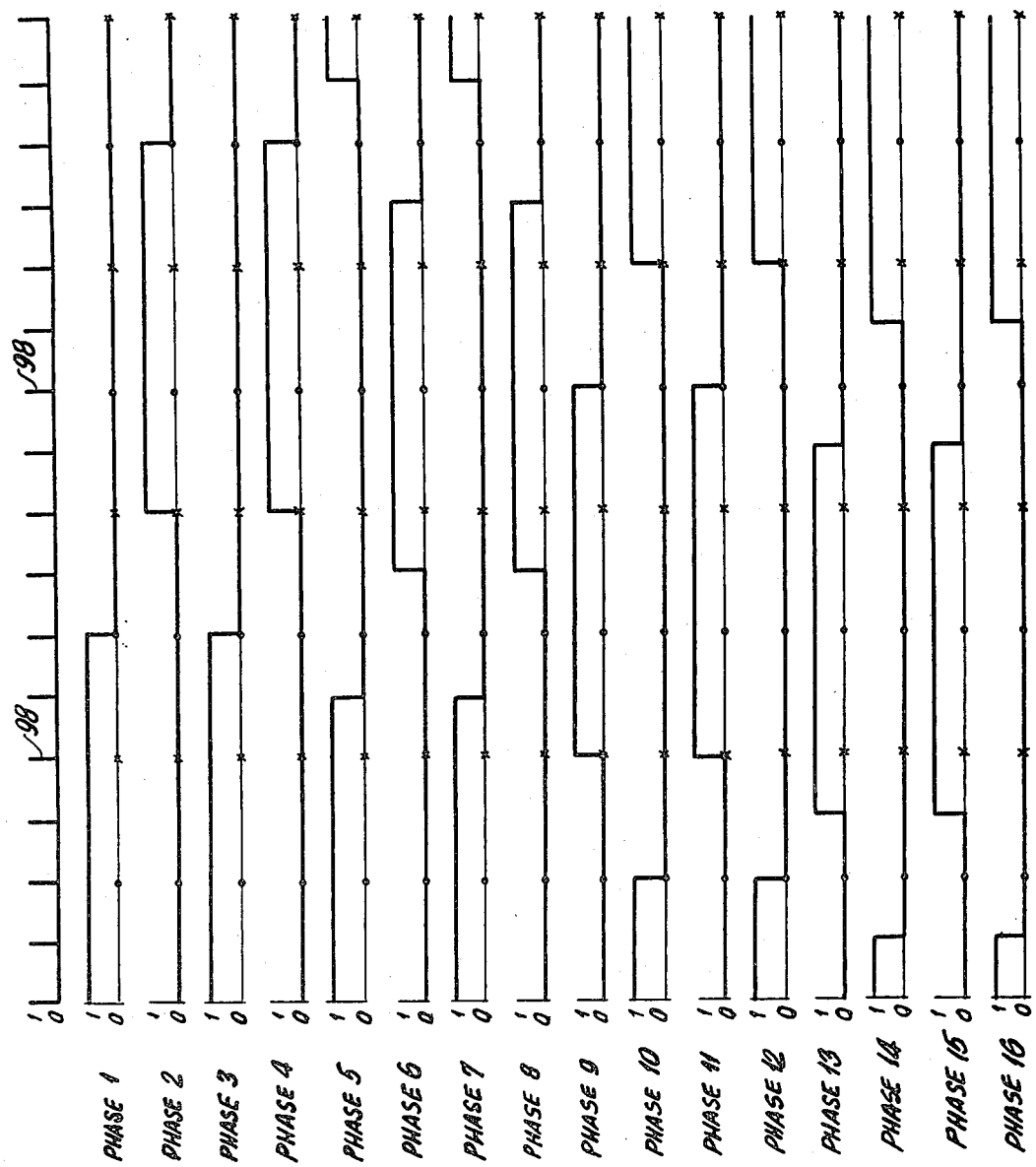
FIG. 18 illustrates a group of graphs showing the operation of the motor of FIG. 11 according to still another embodiment of the invention.
Figure 19:
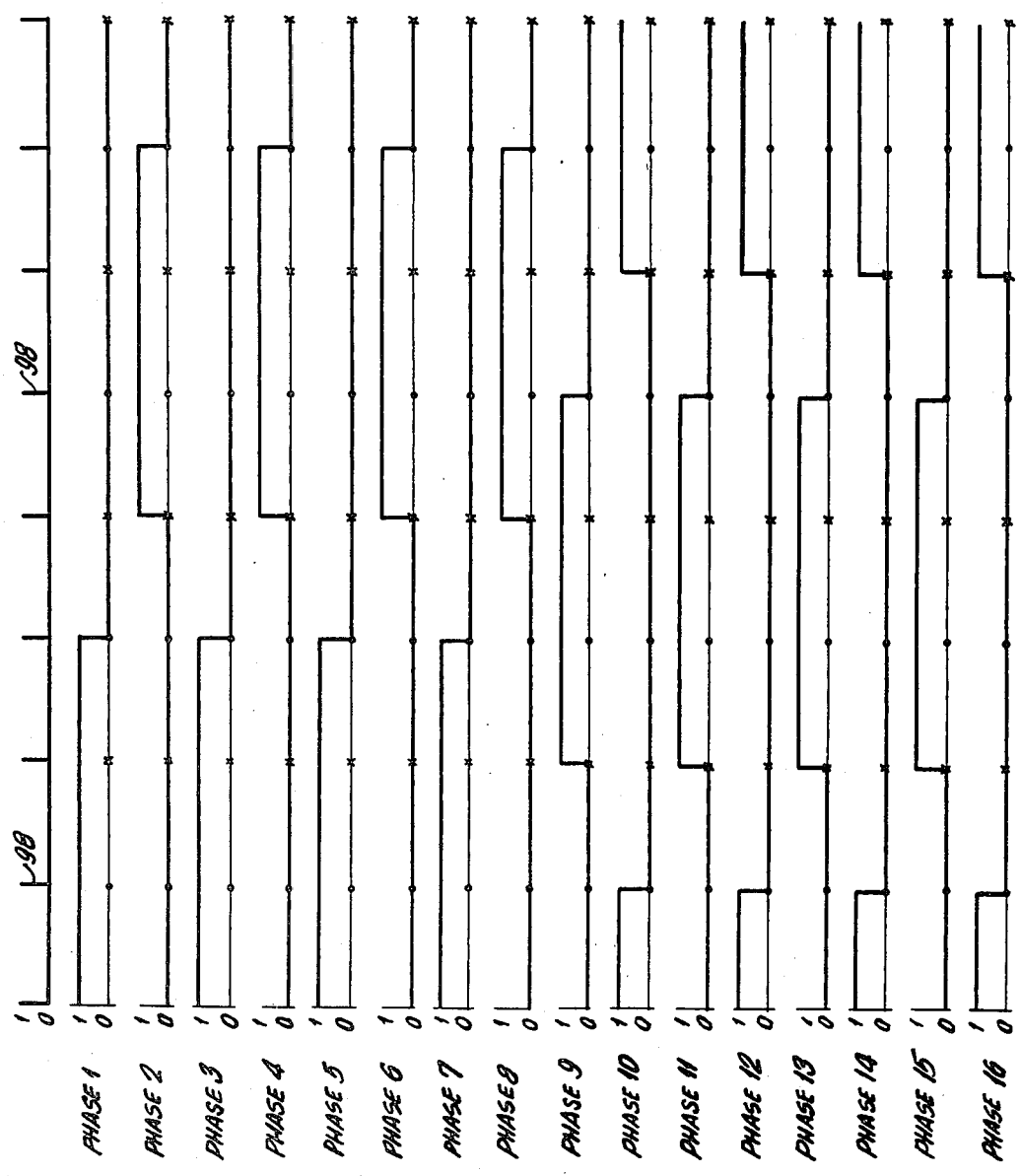
FIG. 19 is a group of graphs showing conditions of the motor in FIG. 11 according to still another embodiment of the invention.
Figure 20:
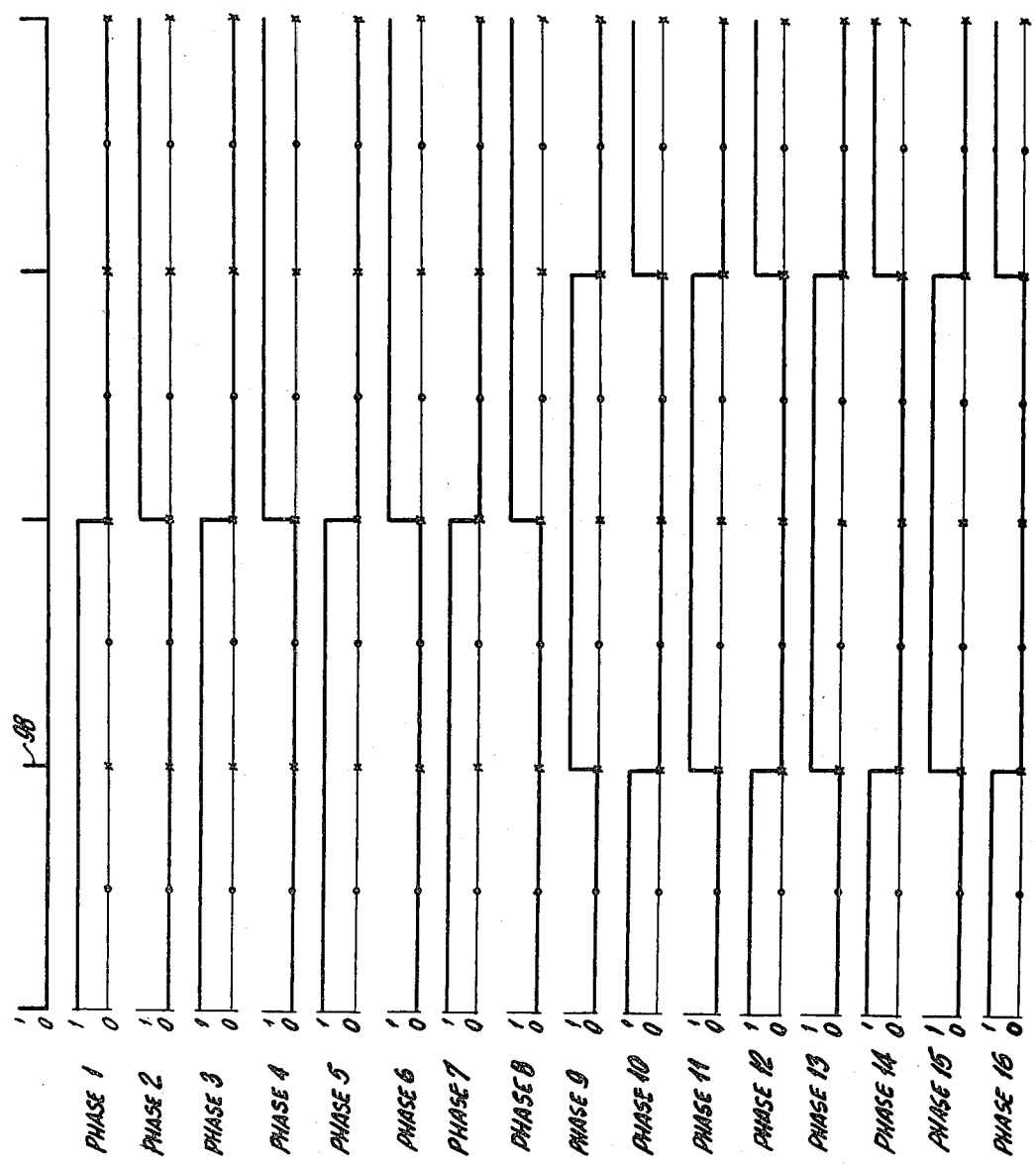
FIG. 20 illustrates a group of graphs showing conditions within the motor of FIG. 11 according to still another embodiment of the invention.

According to another embodiment of the invention, the 16 phase unipolar windings of FIG. 11 are combined with the circuits of FIGS. 6 and 7 to produce quarter step energization as shown in FIG. 18. This is accomplished by closing the switch S1 and using the circuit of FIG. 12 to couple the outputs of FIGS. 6 and 7 with the inputs of FIG. 11. In this arrangement, half-step unipolar operation is obtained by adding the circuit of FIG. 15, while opening switch S2, while closing switch S3. This produces the energization shown in FIG. 19. The energization shown in FIG. 20 results from closing the switch S3 of FIG. 15 when it is connected in FIG. 6 as discussed.

In all of these embodiments, it is possible to reverse the rotation of the motor by applying a step voltage through an inverter to the U/D terminal (the up-down terminal) of the divider 162. The divider 162 is structured for this purpose and is available from Texas Instruments Corporation as Up-Down Divider 74191 in the form of a semiconductor chip.

Figure 12:
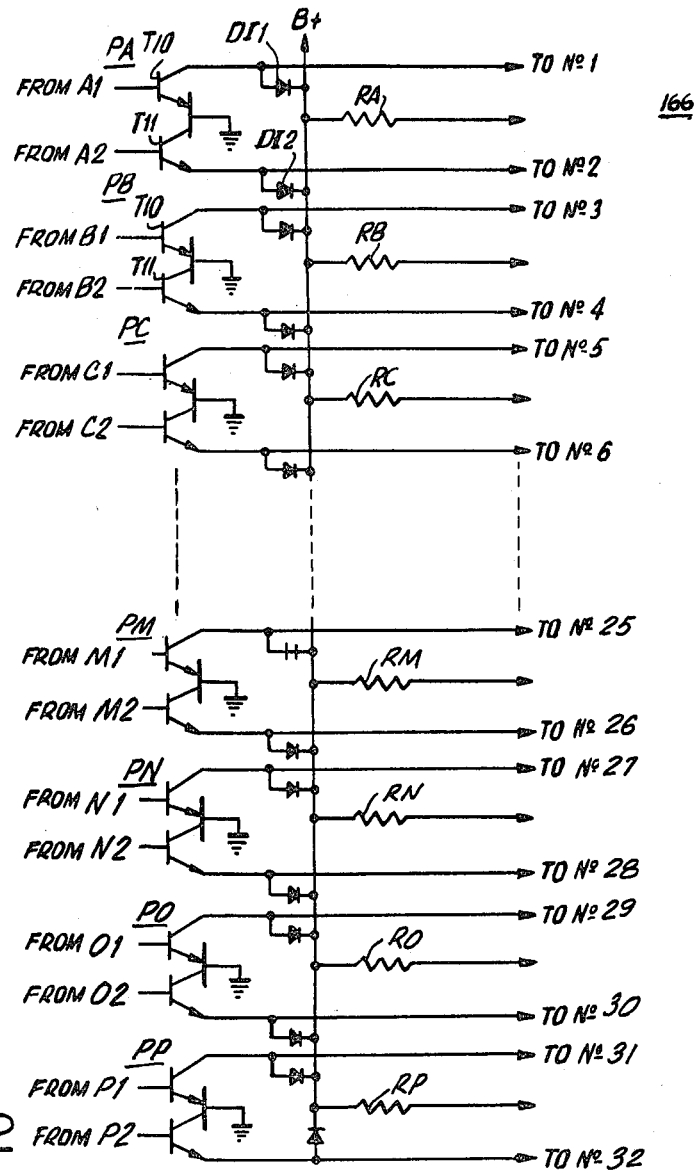
FIG. 12 is a schematic diagram illustrating details of a driver according to another embodiment of the invention.
Figure 21:
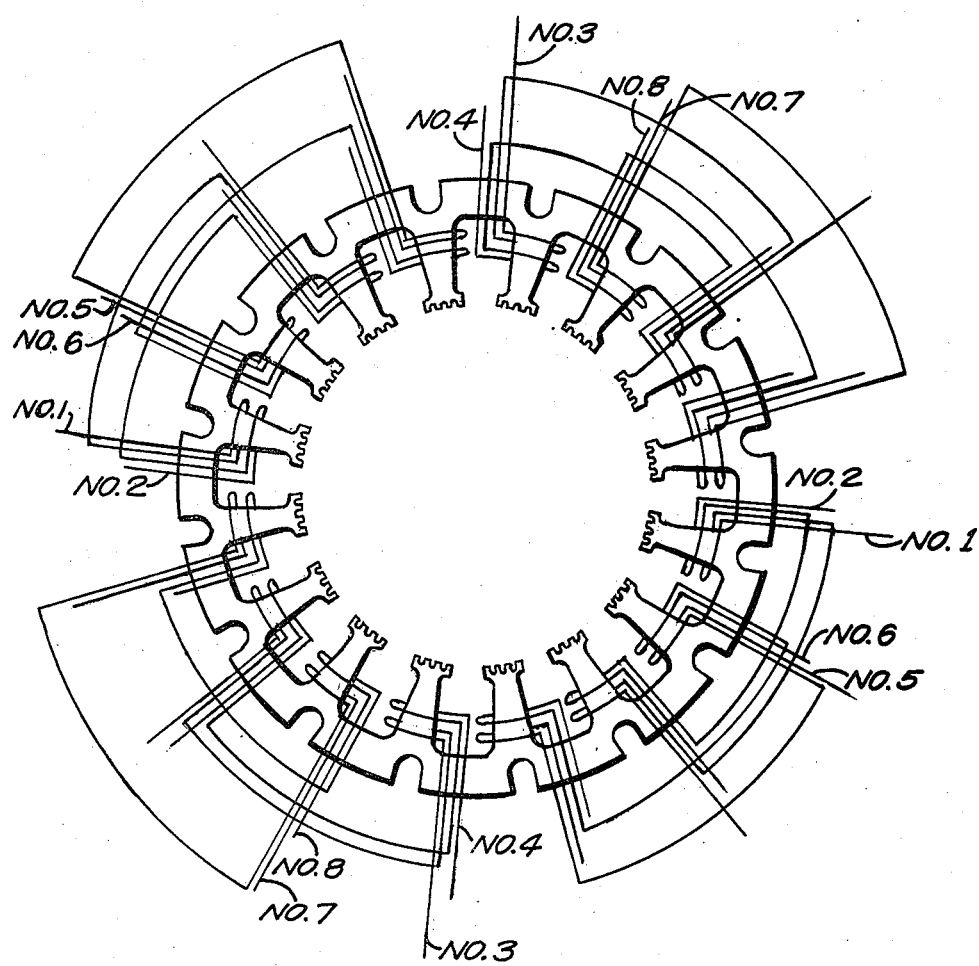
FIG. 21 is a schematic illustration of another motor with windings connected according to another embodiment of the invention.
Figure 22:
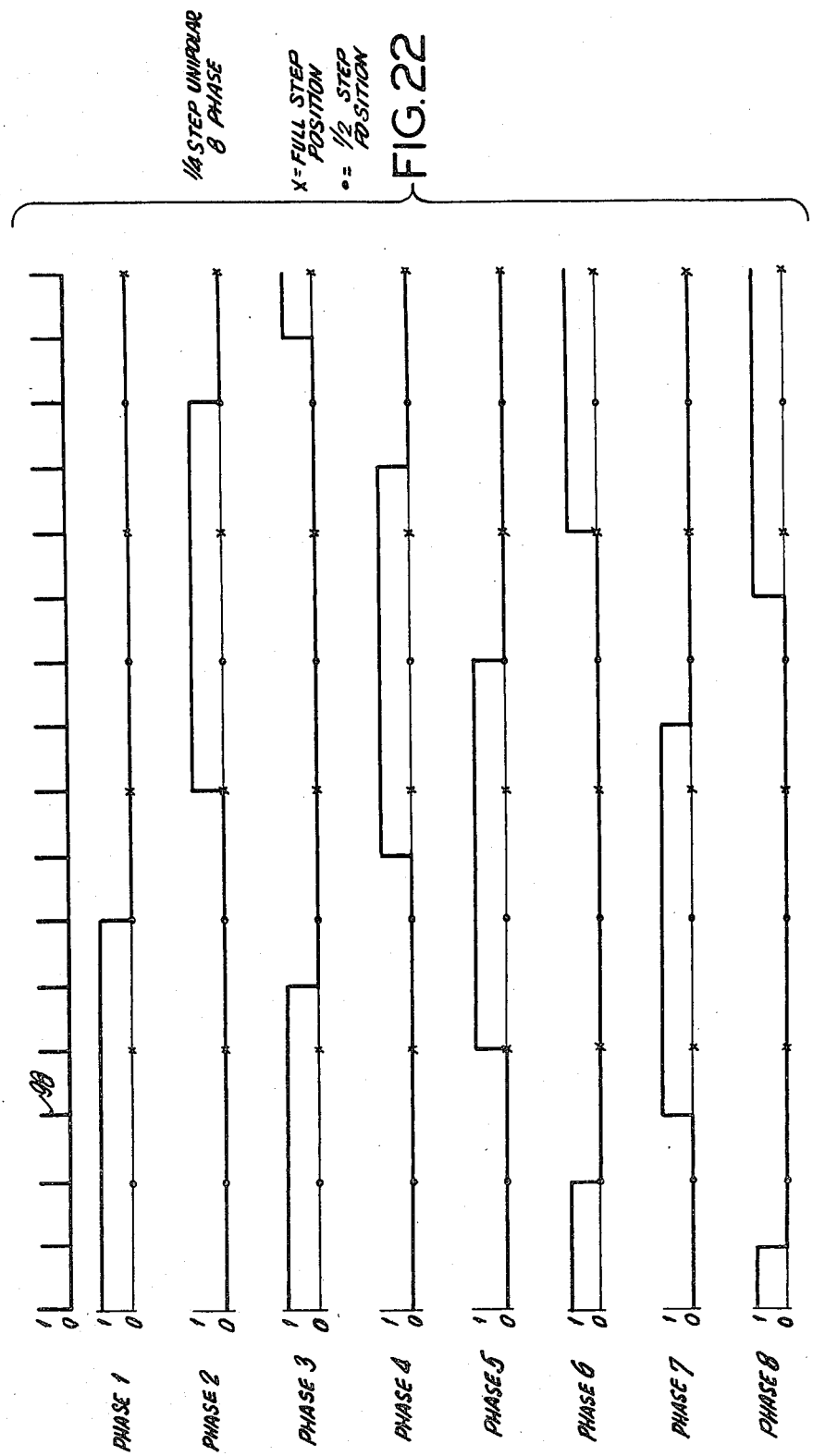
FIG. 22 illustrates a group of graphs showing conditions produced in the motor of FIG. 21 by the driver according to still another embodiment of the invention.
Figure 23:
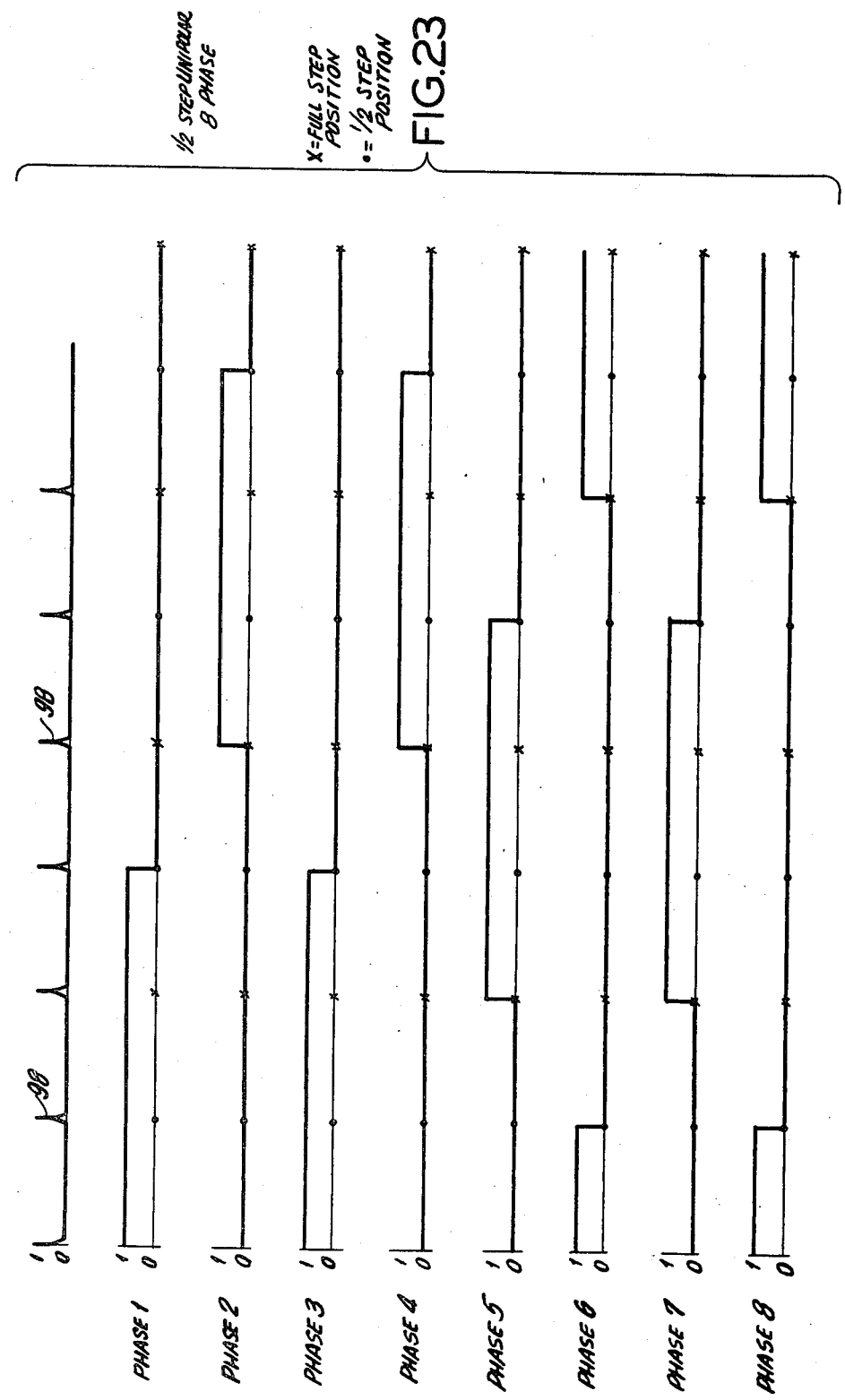

According to another embodiment of the invention, an eight phase unipolar drive is used as shown in FIG. 21. Here, only the portions PA through PD of FIG. 12 are connected to the correspondingly designated terminations of FIGS. 21 and 7. With the switch S1 closed, this produces the unipolar energization shown in FIG. 22 and results in the rotor moving $\frac{1}{4}$ step per pulse. Opening the switch S1 produces the energization shown in FIG. 23 and results in $\frac{1}{2}$ step of rotor rotation per pulse.

Adding the circuit of FIG. 15 while keeping switch S3 closed with switch S2 open produces the energization shown in FIG. 24 and results in a full step per pulse.

Figure 27:
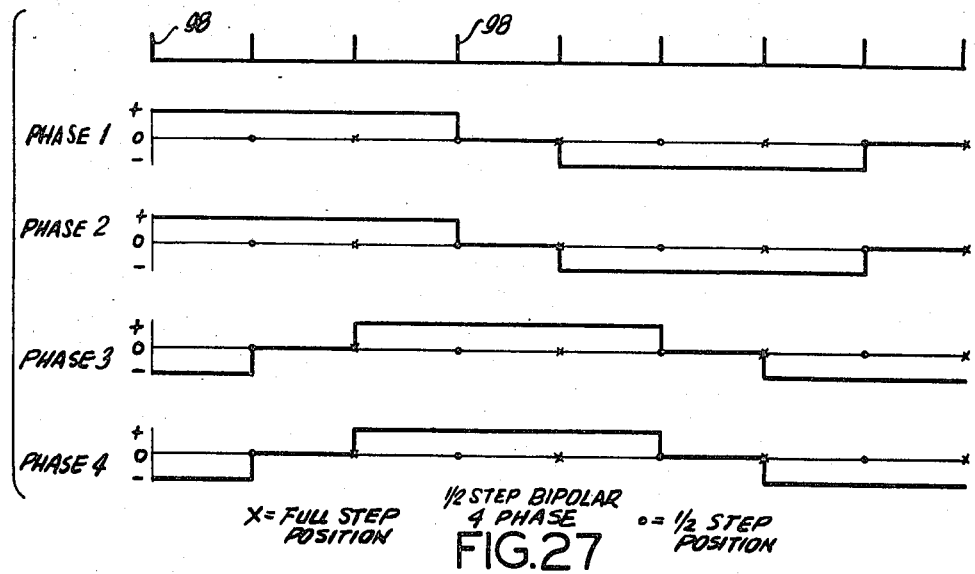
Figure 28:
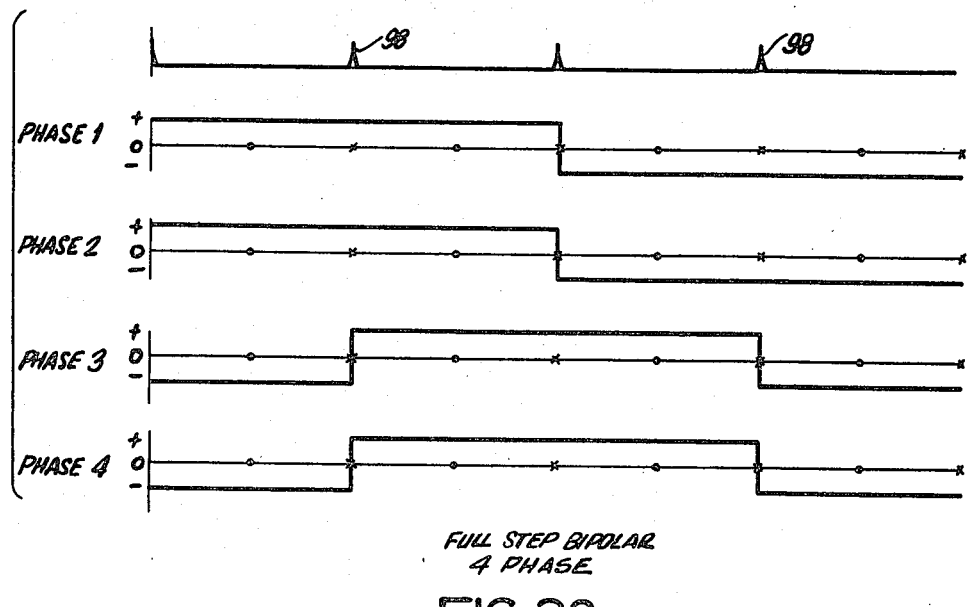

FIG. 25 illustrates another embodiment of the invention. Here, two circuits, such as those shown in FIG. 10, connect the correspondingly identified winding ends (No. 1, No. 2, etc.) to the winding ends A1 to B2 of FIG. 9. With the switch S1 closed, the energization shown in FIG. 26 is produced. This results in $\frac{1}{4}$ step rotation of the rotor. Opening switch S1 produces the energization shown in FIG. 27 and results in half steps. Full steps result from adding the circuit in FIG. 15 and opening switch S2 while closing switch S3. The full step energization is shown in FIG. 28.

The invention affords the possibility of stepping the motor at a plurality of angles. It gives finer resolution than heretofore, limits vibration, and controls resonances although the reason for the latter is not yet established.

Furthermore, it permits large currents and powers to be applied to the collective windings with comparatively small transistors. For example, in the $\frac{1}{8}$ step unipolar 16 phase arrangement of FIGS. 11 and 12 whose voltages are illustrated in FIG. 13A, eight to sixteen of thirty-two transistors simultaneously share the conduction of the total motor current. Either the transistors would have to possess a larger current capability, or complex or wasteful balancing circuitry would be needed to distribute the current among several transistors. Transistors could not simply be connected in parallel because the differences in the transistor characteristics would cause one transistor to carry substantially more than its share of current and possibly burn out. The only way of avoiding such burn-out would be to use transistors having capabilities of carrying a far greater share of the current than expected. This is, of course, a wasteful procedure. The invention avoids such waste and offers means for applying extensive power to the motor through a number of transistors.

As a further point, the current carrying capacity or ordinarily available transistors is limited. This would normally limit the amount of current and power capable of being delivered to a motor. Hence, the sizes of known stepping motors are quite small. The invention obviates the power limit of stepping motors by permitting current to be shared by a number of high-power transistors. In effect, the invention permits multiplication of power to a stepping motor and hence permits the manufacture of high power stepping motors.

The 16 mole motor, according to the invention, permits 400 steps with eight poles per phase, but without the side pull that motors with smaller numbers of poles would produce. That is, there is no side pull at $\frac{1}{8}$ and 174 steps. That is because with $\frac{1}{8}$ and $\frac{1}{4}$ steps, opposite poles are always magnetized in the same direction. Therefore, the magnetic pull on the rotor is equalized. The rotor, according to the invention, need not be as stiff or strong as prior rotors operating with eight pole stators.

According to the invention, the crown 118 of each pole may be made as narrow as the root 116, because the number of poles eliminates the need to expand each pole crown in the direction of adjacent poles. That is, the tooth distribution is achieved by the number of poles rather than by extension of the pole shoes. Furthermore, the more distributive arrangement of the teeth makes it possible to leave sufficient space between adjacent poles to slip preformed windings over the poles. This is of critical importance where heavy windings are used because of the difficulty of winding such heavy wires around the poles directly. The preformed heavy windings can be manufactured separately and, during the assembly operation, mounted on the poles.

The poles, according to the invention, achieve a desired magnetic flow by making the neck 120 equal to the tooth area at the crown 118. This has the advantage of providing a narrowed space between the tooth and the crown and permits prewound windings 76 to be slipped over the poles into the position shown in full lines in FIG. 4A and then pushed against the edge 130 to allow the adjacent coil to be slipped over its crown. Thereafter, each of the coils assumes a position corresponding to that in the full lines of FIG. 4A.

With the structure of the motors in FIGS. 1 to 4A, it is unnecessary to deform the coils 76 before slipping them over the poles. Such deformation would be necessary in prior art devices having polar enlargements. Eight pole motors with such enlargements would reduce the pole area to the point at which the motor would become less effecient. The drop in efficiency of the motor according to the invention is alleviated by the tooth distribution. The reduction in tooth area of the device, according to the invention, is overcome by the low impedance of the devices which permit fast switching, high power, and high speed.

By utilizing eight coils per phase, it is possible to lower the impedance of the motor to values corresponding to 0.042 ohms per phase.

Being able to microstep the motor, i.e., step at less than ½ step, and particularly, being able to operate at ⅛ step without side pull, results in lower noise and vibration and less likelihood of resonance. The resonance improvement is important and results from the fact that resonances are induced by shock. The likelihood of such shock, on the other hand, is reduced by the lower noise and vibration. That is, the microstepping avoids shock excitation and resonance. The changing flux with changing number of pulses excited and hence the spring rate which is necessary for resonance is substantially reduced. This overcomes any difficulties arising from a reduction in pole areas.

The device, according to the invention, is capable of handling higher powers, particularly with low impedance windings.

The preferred embodiment of the invention is the unipolar drive which separates the bifilar windings. That is, the embodiments which utilize multiple unifilar windings are preferred to the bifilar windings so as to avoid cross talk. In prior art devices, separation of bifilar windings would subject the poles to undesired high pulses.

According to the invention, the poles are each 12.4° wide at the teeth. The poles are separated from each other by 10.1°. This arrangement permits optimum tooth area for the types of coils that can be slipped in between the interpolar spacing.

The stator is made from a series of lamina. Each of the lamina contains a recess 172 at each pole. The recesses serve for alignment of the lamina and permit the lamina to be aligned in any of 16 rotary positions. This distribution of rotary positions permits averaging of any errors in the shape of any lamina. The number of poles makes it possible to average over 16 positions, thereby reducing the effects of any errors.

The rotor pole shoes 28, 30, 32, and 34, and stator 40 in FIG. 3 shown as laminated in planes transverse to the rotor and stator axes. However, it will be understood that, according to other embodiments, the rotor or stator, or both, may be solid. The laminated rotor and stator version have the advantage of being able to operate at higher frequencies than the solid rotor and stator.

While embodiments of the invention have been described in detail, it will be evident to those skilled in the art that the invention may be embodied otherwise without departing from its spirit and scope.

What is claimed is:

1. A motor system comprising:
    a stator and a rotor movable relative to each other about an axis,
    said stator having a plurality of radially directed stator poles,
    said poles having stator teeth arranged in a circle around the axis, said teeth on each pole having a given pitch, the pitch on one pole being the same as the pitch on every other pole,
    said rotor having permanently magnetized teeth,
    a coil on each of said stator poles, and
    means for energizing the coils,
    the number of poles on said stator being sixteen at regular intervals of twenty two and one-half mechanical degrees and each having a plurality of teeth offset from the teeth on the poles ninety degrees therefrom by one full pitch and offset from the teeth on adjacent poles by one-quarter pitch,
    said stator poles each having a root toward the outer periphery of said stator and a crown at said teeth, said poles each being narrowed between said root and said crown,
    said root and said crown having absolute dimensions along the tangential direction and the absolute dimension along the tangential direction of said root and said crown being substantially the same.

2. A system as in claim 1, wherein said narrowed portion between said root and said crown forming a neck, the absolute dimension in the tangential direction at said neck of a pole being substantially equal to the sum of the absolute dimensions in the tangential direction of the teeth on the pole.

3. A system as in claim 1, wherein said stator includes a plurality of lamina.

4. A system as in claim 3, wherein the lamina are randomly arranged along sixteen directions so that the dimensions of each of said poles is averaged through the axial direction of said stator.

5. A motor system comprising:
    a stator and a rotor movable relative to each other about an axis,
    said stator having a plurality of radially directed stator poles,
    said poles having stator teeth arranged in a circle around the axis, said teeth on each pole having a given pitch, the pitch on one pole being the same as the pitch on every other pole,
    said rotor having permanently magnetized teeth,
    a coil on each of said stator poles, and
    means for energizing the coils,
    the number of poles on said stator being sixteen at regular intervals of twenty two and one-half mechanical degrees and each having a plurality of teeth offset from the teeth on the poles ninety degrees therefrom by one full pitch and offset from the teeth on adjacent poles by one-quarter pitch,
    said stator poles each having a root toward the outer periphery of said stator and a crown at said teeth, said poles each being narrowed between said root and said crown,
    said narrowed portion between said root and said crown forming a neck, the absolute dimension in the tangential direction at said neck of a pole being substantially equal to the sum of the absolute dimensions, in the tangential direction, of the teeth on the pole.

6. A motor system comprising:
    a stator and a rotor movable relative to each other about an axis,
    said stator having a plurality of radially directed stator poles,
    said poles having stator teeth arranged in a circle around the axis, said teeth on each pole having a given pitch, the pitch on one pole being the same as the pitch on every other pole,
    said rotor having permanently magnetized teeth,
    a coil on each of said stator poles, and
    means for energizing the coils, the number of poles on said stator being sixteen at regular intervals of twenty two and one-half mechanical degrees and each having a plurality of teeth offset from the teeth on the poles ninety degrees therefrom by one full pitch and offset from the teeth on adjacent poles by one-quarter pitch, said stator poles each having a root toward the outer periphery of said stator and a crown at said teeth, said poles each being narrowed between said root and said crown, the inner diameter of said stator at said teeth is substantially three-quarters of the diameter of the stator at its outer periphery.

7. A system as in claim 6, wherein said poles have an angular dimension of 12.4 degrees plus or minus one degree.

8. A system as in claim 7, wherein said angular dimension is 12.4 plus or minus one-quarter degree.

9. A system as in claim 8, wherein said angular dimension is plus or minus 0.1 degree.

10. A system as in claim 9, wherein the angular dimension across the neck of each pole is 7.2 degrees plus or minus one degree.

11. A system as in claim 10, wherein the angular dimension at said neck is 7.2 degrees plus or minus one-quarter degree.

12. A system as in claim 11, wherein said angular dimension at said neck is 7.2 degrees plus or minus 0.1 degree.

13. A motor system comprising:

a stator and a rotor movable relative to each other about an axis, said stator having a plurality of radially directed stator poles, said poles having stator teeth arranged in a circle around the axis, said teeth on each pole having a given pitch, the pitch on one pole being the same as the pitch on every other pole, said rotor having permanently magnetized teeth, a coil on each of said stator poles, and means for energizing the coils, the number of poles on said stator being sixteen at regular intervals of twenty two and one-half mechanical degrees and each having a plurality of teeth offset from the teeth on the poles ninety degrees therefrom by one full pitch and offset from the teeth on adjacent poles by one-quarter pitch, said stator poles each having a root toward the outer periphery of said stator and a crown at said teeth, said poles each being narrowed between said root and said crown, said coils each having a central opening substantially equal to but clearing the crown on each of said poles, said coil has a thickness along the peripheral direction of the stator less than half the distance between the neck of one pole and the crown of the adjacent pole.

* * * * *